US012437697B2

(12) United States Patent
Zhao et al.

(10) Patent No.: US 12,437,697 B2
(45) Date of Patent: Oct. 7, 2025

(54) PIXEL DRIVE CIRCUIT AND DISPLAY APPARATUS

(71) Applicant: BOE Technology Group Co., Ltd., Beijing (CN)

(72) Inventors: Donghui Zhao, Beijing (CN); Pan Xu, Beijing (CN); Ying Han, Beijing (CN); Xing Zhang, Beijing (CN); Chengyuan Luo, Beijing (CN); Guangshuang Lv, Beijing (CN); Xing Yao, Beijing (CN); Dandan Zhou, Beijing (CN); Miao Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/290,015

(22) PCT Filed: Nov. 23, 2022

(86) PCT No.: PCT/CN2022/133824
§ 371 (c)(1),
(2) Date: Nov. 9, 2023

(87) PCT Pub. No.: WO2024/108444
PCT Pub. Date: May 30, 2024

(65) Prior Publication Data

US 2025/0095536 A1 Mar. 20, 2025

(51) Int. Cl.
*G09G 3/20* (2006.01)

(52) U.S. Cl.
CPC ... *G09G 3/2092* (2013.01); *G09G 2310/0267* (2013.01)

(58) Field of Classification Search
CPC ......... G09G 3/2092; G09G 2310/0267; G09G 3/3233; G09G 3/3266; G09G 3/20; G02F 1/133; H10D 86/00
See application file for complete search history.

(56) References Cited

U.S. PATENT DOCUMENTS

2001/0022572 A1 9/2001 Murade
2008/0043005 A1 * 2/2008 Kanda .................... G09G 3/325 345/204

(Continued)

FOREIGN PATENT DOCUMENTS

CN 1242842 A 1/2000
CN 101127181 A 2/2008

(Continued)

*Primary Examiner* — Matthew A Eason
*Assistant Examiner* — Chayce R Bibbee
(74) *Attorney, Agent, or Firm* — XSENSUS LLP

(57) ABSTRACT

Provided is a pixel drive circuit. The pixel drive circuit includes a plurality of scan drive circuits transmitting gate drive signals to pixels, a plurality of emission drive circuits transmitting emission control signals to the pixels, a plurality of compensation drive circuits transmitting compensation signals to the pixels, and a plurality of reset drive circuits transmitting reset signals to the pixels, which are all cascaded in a pixel column direction. In addition, the scan drive circuit, the emission drive circuit, the compensation drive circuit, and the reset drive circuit corresponding to the same row of pixels are arranged sequentially along a pixel row direction, the scan drive circuit being disposed farthest away from the pixels. Moreover, among signal lines coupled to the pixel drive circuit, a plurality of signal lines is overlapped with each other, and cutouts are provided at the overlapping portions of the plurality of signal lines.

20 Claims, 19 Drawing Sheets

(56) References Cited

U.S. PATENT DOCUMENTS

| | | | |
|---|---|---|---|
| 2015/0206488 | A1 | 7/2015 | Zhang et al. |
| 2015/0302934 | A1 | 10/2015 | Qi et al. |
| 2016/0275845 | A1 | 9/2016 | Tsai et al. |
| 2017/0179166 | A1 | 6/2017 | Xiao et al. |
| 2018/0247592 | A1 | 8/2018 | Zhang et al. |
| 2018/0374442 | A1 | 12/2018 | Hao |
| 2021/0210005 | A1* | 7/2021 | Zhou ...................... G09G 3/325 |
| 2023/0066613 | A1* | 3/2023 | Liu ...................... G09G 3/3266 |

FOREIGN PATENT DOCUMENTS

| | | | |
|---|---|---|---|
| CN | 103996367 | A | 8/2014 |
| CN | 105093751 | A | 11/2015 |
| CN | 105182646 | A | 12/2015 |
| CN | 105957474 | A | 9/2016 |
| CN | 105989803 | A | 10/2016 |
| CN | 106847227 | A | 6/2017 |
| CN | 112433415 | A | 3/2021 |

* cited by examiner

PIXEL DRIVE CIRCUIT AND DISPLAY APPARATUS

CROSS-REFERENCE TO RELATED APPLICATION

The present disclosure is a U.S. national stage of international application No. PCT/CN2022/133824, filed on Nov. 23, 2022, the disclosure of which is herein incorporated by reference in its entirety.

TECHNICAL FIELD

The present disclosure relates to the field of display technologies, and in particular, to a pixel drive circuit and a display apparatus.

BACKGROUND

In the field of display technologies, a display apparatus generally includes a pixel drive circuit and a plurality of pixels. The pixel drive circuit is coupled to the plurality of pixels to drive the pixels to emit light.

SUMMARY

According to some embodiments of the present disclosure, a pixel drive circuit is provided. The pixel drive circuit includes:

- a plurality of scan drive circuits cascaded in a pixel column direction, wherein the plurality of scan drive circuits are coupled to a plurality of rows of pixels via a plurality of gate lines; and each of the scan drive circuits is further coupled to a scan drive line and is configured to transmit a gate drive signal to a gate line coupled to the scan drive circuit based on a drive signal provided by the scan drive line;
- a plurality of emission drive circuits cascaded in the pixel column direction, wherein the plurality of emission drive circuits are coupled to the plurality of rows of pixels via a plurality of emission control lines; and each of the emission drive circuits is further coupled to an emission drive line and is configured to transmit an emission control signal to an emission control line coupled to the emission drive circuit based on a drive signal provided by the emission drive line;
- a plurality of compensation drive circuits cascaded in the pixel column direction, wherein the plurality of compensation drive circuits are coupled to the plurality of rows of pixels via a plurality of compensation lines; and each of the compensation drive circuits is further coupled to a compensation drive line and is configured to transmit a compensation signal to a compensation line coupled to the compensation drive circuit based on a drive signal provided by the compensation drive line; and
- a plurality of reset drive circuits cascaded in the pixel column direction, wherein the plurality of reset drive circuits are coupled to the plurality of rows of pixels via a plurality of reset lines; and each of the reset drive circuits is further coupled to a reset drive line and is configured to transmit a reset signal to a reset line coupled to the reset drive circuit based on a drive signal provided by the reset drive line; and
- wherein a scan drive circuit, a emission drive circuit, a compensation drive circuit, and a reset drive circuit that are coupled to a same row of pixels are arranged sequentially in a pixel row direction, and the scan drive circuit is disposed on a side distal to the pixels; and among signal lines as coupled in the pixel drive circuit, a plurality of the signal lines is overlapped with each other, and cutouts are provided at overlapping portions of the plurality of signal lines.

In some embodiments, along the pixel row direction, the scan drive circuit, the emission drive circuit, the compensation drive circuit, and the reset drive circuit that are coupled to the same row of pixels are arranged sequentially in a direction proximal to the pixels.

In some embodiments, each of the scan drive line, the emission drive line, the compensation drive line, and the reset drive line includes: a direct current drive line for providing a direct current signal and an alternating current drive line for providing an alternating current signal; and

- for the scan drive circuit, the emission drive circuit, the compensation drive circuit, and the reset drive circuit, the direct current drive line coupled to each drive circuit is disposed on both sides of the drive circuit in the pixel row direction, and the alternating current drive line coupled to each drive circuit is disposed on one side distal to the drive circuit of the direct current drive line.

In some embodiments, the pixel drive circuit and the pixels are both disposed on a same side of a substrate; and

- each of the drive lines includes: a plurality of metal layers sequentially stacked along a direction away from the substrate, and an insulating layer further disposed between every two adjacent metal layers, every two adjacent metal layers being interconnected through a via hole penetrating through the insulating layer.

In some embodiments, each of the drive lines includes: two metal layers sequentially stacked along the direction away from the substrate.

In some embodiments, the pixel includes a gate (GATE) metal layer, an inter-layer di-electric (ILD) layer, and a source-drain (SD) metal layer sequentially stacked along a direction away from the substrate; and

- for the two metal layers, one metal layer is disposed on a same layer as the GATE metal layer, and the other metal layer is disposed on a same layer as the SD metal layer; and the insulating layer between the two metal layers is disposed on a same layer as the ILD layer.

In some embodiments, the cutout is provided on the GATE metal layer.

In some embodiments, the plurality of scan drive circuits are coupled to the plurality of rows of pixels in one-to-one correspondence;

- the plurality of emission drive circuits are coupled to the plurality of rows of pixels in one-to-one correspondence, or each of the emission drive circuits is coupled to at least two rows of pixels;
- the plurality of compensation drive circuits are coupled to the plurality of rows of pixels in one-to-one correspondence, or each of the compensation drive circuits is coupled to at least two rows of pixels; and
- the plurality of reset drive circuits are coupled to the plurality of rows of pixels in one-to-one correspondence, or each of the reset drive circuits is coupled to at least two rows of pixels.

In some embodiments, each of the emission drive circuits is coupled to two adjacent rows of pixels or four adjacent rows of pixels;

- each of the compensation drive circuits is coupled to two adjacent rows of pixels or four adjacent rows of pixels; and each of the reset drive circuits is coupled to two adjacent rows of pixels or four adjacent rows of pixels.

In some embodiments, each of the emission drive circuits is coupled to two adjacent rows of pixels, each of the compensation drive circuits is coupled to two adjacent rows of pixels, and each of the reset drive circuits is coupled to two adjacent rows of pixels;

for every two adjacent rows of pixels, in the pixel column direction, a total width of two scan drive circuits coupled to the two rows of pixels in one-to-one correspondence is equal to a width of one emission drive circuit coupled to the two rows of pixels, is equal to a width of one compensation drive circuit coupled to the two rows of pixels, and is equal to a width of one reset drive circuit coupled to the two rows of pixels; and in the pixel row direction, a length of the scan drive circuit is greater than a length of the emission drive circuit, greater than a length of the compensation drive circuit, and greater than a length of the reset drive circuit; the length of the compensation drive circuit is equal to the length of the reset drive circuit and greater than the length of the emission drive circuit; and the compensation drive circuit has a same structure as the reset drive circuit.

In some embodiments, each of the emission drive circuit, the compensation drive circuit, and the reset drive circuit includes: an input sub-circuit, an output sub-circuit, a pull-down control sub-circuit, and an anti-creeping pull-down sub-circuit; and wherein the input sub-circuit is coupled to a first clock terminal, an input terminal, and a pull-up node, respectively, and is configured to control the potential of the pull-up node based on the first clock signal provided by the first clock terminal and the input signal provided by the input terminal;

the output sub-circuit is respectively coupled to the pull-up node, a first power supply terminal, and an output terminal, and is configured to control a potential of the output terminal based on the potential of the pull-up node and a first power supply signal provided by the first power supply terminal;

the pull-down control sub-circuit is respectively coupled to the first power supply terminal, the first clock terminal, a second clock terminal, and a pull-down node, and is configured to control a potential of the pull-down node based on the first power supply signal, the first clock signal, and a second clock signal provided by the second clock terminal; and the anti-creeping pull-down sub-circuit is respectively coupled to the pull-down node, a second power supply terminal, a third power supply terminal, and the output terminal, and is configured to control the potential of the output terminal based on the potential of the pull-down node, a second power supply signal provided by the second power supply terminal, and a third power supply signal provided by the third power supply terminal.

In some embodiments, for the emission drive circuit, the compensation drive circuit, and the reset drive circuit, the output terminal of each of the drive circuits is respectively coupled to the pixels and another stage of said cascaded drive circuit; and the anti-creeping pull-down sub-circuit is configured to control the potential of the output terminal based on the potential of the pull-down node, the second power supply signal, and the third power supply signal.

In some embodiments, the anti-creeping pull-down sub-circuit includes: a first transistor, a second transistor, a third transistor, and a first capacitor; and wherein gates of the first transistor and the second transistor are both coupled to the pull-down node, a first electrode of the first transistor is coupled to the second power supply terminal, a second electrode of the first transistor is coupled to a first electrode of the second transistor, and a second electrode of the second transistor is coupled to the output terminal;

a gate of the third transistor is coupled to the output terminal, a first electrode of the third transistor is coupled to the third power supply terminal, and a second electrode of the third transistor is coupled to the second electrode of the first transistor; and one end of the first capacitor is coupled to the pull-down node, and another end of the first capacitor is coupled to the second power supply terminal.

In some embodiments, for the emission drive circuit, the compensation drive circuit, and the reset drive circuit, the output terminal of each of the drive circuits includes: a drive output terminal and a shift output terminal, wherein the drive output terminal is coupled to the pixels, and the shift output terminal is coupled to another stage of the drive circuit as cascaded; and the anti-creeping pull-down sub-circuit is further coupled to the pull-up node and a fourth power supply terminal respectively, and is configured to control a potential of the shift output terminal based on the potential of the pull-up node, the potential of the pull-down node, the second power supply signal, and the third power supply signal, and to control a potential of the drive output terminal based on the potential of the pull-down node and a fourth pull-down power supply signal provided by the fourth power supply terminal.

In some embodiments, the anti-creeping pull-down sub-circuit includes: a fourth transistor, a fifth transistor, a sixth transistor, a seventh transistor, and a second capacitor; and wherein in gates of the fourth transistor and the fifth transistor are both coupled to the pull-down node, a first electrode of the fourth transistor is coupled to the second power supply terminal, a second electrode of the fourth transistor is coupled to a first electrode of the fifth transistor, and a second electrode of the fifth transistor is coupled to the shift output terminal;

a gate of the sixth transistor is coupled to the pull-up node, a first electrode of the sixth transistor is coupled to the third power supply terminal, and a second electrode of the sixth transistor is coupled to the first electrode of the fifth transistor;

a gate of the seventh transistor is coupled to the pull-down node, a first electrode of the seventh transistor is coupled to the fourth power supply terminal, and a second electrode of the seventh transistor is coupled to the drive output terminal; and one end of the second capacitor is coupled to the pull-down node, and another end of the second capacitor is coupled to the fourth power supply terminal.

In some embodiments, for the plurality of cascaded scan drive circuits, an input terminal of an $N^{th}$ scan drive circuit is coupled to an output terminal of an $(N-2)^{th}$ scan drive circuit, a reset terminal of the $N^{th}$ scan drive circuit is coupled to an output terminal of an (N+4)th scan drive circuit, and the scan drive circuits coupled to odd-numbered rows of pixels share same input terminals and the same reset terminals with the scan drive circuits coupled to even-numbered rows of pixels, where N is an integer greater than or equal to 3, and N is smaller than a number of the plurality of scan drive circuits; and for the plurality of cascaded emission drive circuits, the plurality of cascaded compensation drive circuits, and the plurality of cascaded reset drive circuits, an output terminal of a previous drive circuit is coupled to an input terminal of an adjacent next-stage drive circuit, and a reset terminal of a previous drive circuit is coupled to an output terminal of an adjacent next-stage drive circuit.

In some embodiments, the transistors included in the pixel drive circuit are all made of an oxide material.

In some embodiments, the pixel drive circuit includes:

two sets of scan drive circuits respectively disposed on both sides of the pixels in the pixel row direction, each set of scan drive circuits including the plurality of scan drive circuits as cascaded;

two sets of emission drive circuits respectively disposed on both sides of the pixels in the pixel row direction, each set of emission drive circuits including the plurality of emission drive circuits as cascaded;

two sets of compensation drive circuits respectively disposed on both sides of the pixels in the pixel row direction, each set of compensation drive circuits including the plurality of compensation drive circuits as cascaded; and two sets of reset drive circuits respectively disposed on both sides of the pixels in the pixel row direction, each set of reset drive circuits including the plurality of reset drive circuits as cascaded.

According to some embodiments of the present disclosure, a display apparatus is provided. The display apparatus includes a plurality of pixels and the pixel drive circuit as described in the above embodiments, wherein the pixel drive circuit is coupled to the plurality of pixels and is configured to drive the plurality of pixels to emit light.

In some embodiments, each of the pixels includes: a pixel circuit and an emission element, wherein the pixel circuit includes: a data writing sub-circuit, a emission control sub-circuit, a compensation sub-circuit, a reset sub-circuit, a potential adjustment sub-circuit, and a drive sub-circuit; and wherein the data writing sub-circuit is respectively coupled to a gate line, a data line, and a control terminal of the drive sub-circuit, and is configured to control connection and disconnection between the data line and the control terminal of the drive sub-circuit based on a gate drive signal provided by the gate line;

the emission control sub-circuit is respectively coupled to an emission control line, a charging power supply line, and an input terminal of the drive sub-circuit, and is configured to control connection and disconnection between the charging power supply line and the input terminal of the drive sub-circuit based on an emission control signal provided by the emission control line;

the compensation sub-circuit is respectively coupled to a compensation line, a reference signal line, and the control terminal of the drive sub-circuit, and is configured to control connection and disconnection between the reference signal line and the control terminal of the drive sub-circuit based on a compensation signal provided by the compensation line;

the reset sub-circuit is respectively coupled to a reset line, an initial power supply line, and the output terminal of the drive sub-circuit, and is configured to control connection and disconnection between the initial power supply line and the output terminal of the drive sub-circuit based on a reset signal provided by the reset line;

the potential adjustment sub-circuit is respectively coupled to the control terminal of the drive sub-circuit and the output terminal of the drive sub-circuit, and is configured to adjust a potential of the control terminal of the drive sub-circuit and a potential of the output terminal of the drive sub-circuit;

the output terminal of the drive sub-circuit is further coupled to a first electrode of the emission element, and is configured to transmit an emission drive signal to the first electrode of the emission element based on a potential of the input terminal of the drive sub-circuit and the potential of the control terminal of the drive sub-circuit; and a second electrode of the emission element is further coupled to a pull-down power supply line and is configured to emit light based on the emission drive signal and a pull-down power supply signal provided by the pull-down power supply line.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
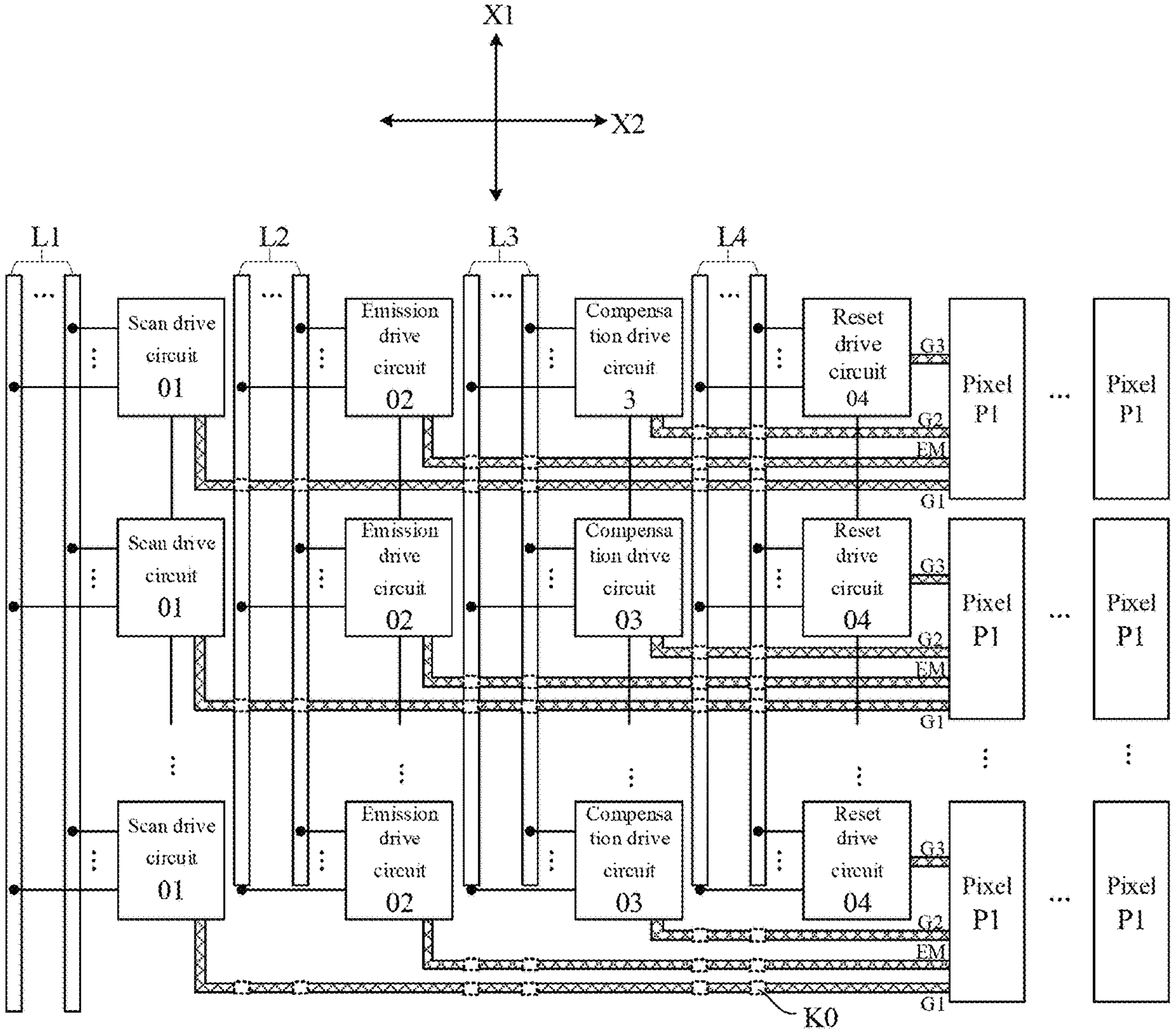
FIG. 1 is a schematic structural diagram of a pixel drive circuit according to some embodiments of the present disclosure.

For clearer descriptions of the objectives, technical solutions, and advantages of the present disclosure, embodiments of the present disclosure are further described in detail below with reference to the accompanying drawings.

In some practices, pixels typically include pixel circuits and emission elements coupled to each other. The pixel circuits are coupled to gate lines, reset lines, compensation lines, and emission control lines. The pixel circuits are configured to transmit drive signals to the emission elements based on gate drive signals provided by the gate lines, reset signals provided by the reset lines, compensation signals provided by the compensation lines, and emission control signals provided by the emission control lines, so as to drive the emission elements to emit light. Accordingly, pixel drive circuits generally include: scan circuits coupled to the gate lines to transmit gate drive signals to the gate lines; reset drive circuits coupled to the reset lines to transmit reset signals to the reset lines; compensation drive circuits coupled to the compensation lines to transmit compensation signals to the compensation lines; and emission drive circuits coupled to the emission control lines to transmit emission control signals to the emission control lines.

However, due to spatial constraints in the layout of the display apparatus, a large number of crossovers are present in the multiple signal lines coupled to the pixel drive circuits and the pixel circuits, leading to increased parasitic capacitance on the signal lines. This, in turn, causes interference with the signals transmitted to the pixel circuits.

A pixel drive circuit and a display apparatus are provided to solve the problem of interference with signals transmitted to pixel circuits due to a large number of crossovers in the related art. The technical solutions are as follows.

Transistors employed in all embodiments of the present disclosure are thin-film transistors, field-effect transistors or other devices having the same characteristics, and the transistors employed in the embodiments of the present disclosure are mainly switching transistors according to the role in circuits. As the source and drain of the switching transistor employed herein are symmetrical, the source and drain are interchangeable. In the embodiments of the present disclosure, the source is referred to as a first electrode, and the drain is referred to as a second electrode. It is provided according to the form in the accompanying drawings that the middle terminal of a transistor is the control gate, which can also be referred to as the gate, and the signal input terminal is the source, while the signal output terminal is the drain. In addition, the switching transistor employed in the embodiments of the present disclosure includes any one of a P-type switching transistor and an N-type switching transistor, wherein the P-type switching transistor is conducted in the case that the gate is at a lower level and cut off in a case that the gate is at a higher level, and the N-type switching transistor is conducted in the case that the gate is at a higher level and cut off in the case that the gate is at a lower level. In addition, various signals in the embodiments of the present disclosure correspond to a first potential and a second potential. The first potential and the second potential represent only two states of the potential of the signal and do not imply any specific numerical values for the first potential or the second potential throughout the entire document.

FIG. 1 is a schematic structural diagram of the pixel drive circuit according to some embodiments of the present disclosure. As shown in FIG. 1, the pixel drive circuit includes:

- a plurality of scan drive circuits 01 cascaded in the pixel column direction X1, wherein the plurality of scan drive circuits 01 are coupled (i.e., electrically connected) to a plurality of rows of pixels P1 via a plurality of gate lines G1; and each of the scan drive circuits 01 is further coupled to a scan drive line L1 and is configured to transmit a gate drive signal to a gate line G1 coupled to the scan drive circuit 01 based on a drive signal provided by the scan drive line L1; it should be noted that FIG. 1 only schematically shows the coupling of one pixel P1 with one gate line G1; and the same applies to the following circuits, which is not repeated herein;
- a plurality of emission drive circuits 02 cascaded in the pixel column direction X1, wherein the plurality of emission drive circuits 02 are coupled to the plurality of rows of pixels P1 via a plurality of emission control lines EM, and each of the emission drive circuits 02 is further coupled to an emission drive line L2 and is configured to transmit an emission control signal to an emission control line EM coupled to the emission drive circuit 02 based on a drive signal provided by the emission drive line L2;

a plurality of compensation drive circuits 03 cascaded in the pixel column direction X1, wherein the plurality of compensation drive circuits 03 are coupled to the plurality of rows of pixels P1 via a plurality of compensation lines G2, and each of the compensation drive circuits 03 is further coupled to a compensation drive line L3 and is configured to transmit a compensation signal to a compensation line G2 coupled to the compensation drive circuit 03 based on a drive signal provided by the compensation drive line L3; and a plurality of reset drive circuits 04 cascaded in the pixel column direction X1, wherein the plurality of reset drive circuits 04 are coupled to the plurality of rows of pixels P1 via a plurality of reset lines G3, and each of the reset drive circuits 04 is further coupled to a reset drive line L4 and is configured to transmit a reset signal to a reset line G3 coupled to the reset drive circuit 04 based on a drive signal provided by the reset drive line L4.

The scan drive circuit 01, the emission drive circuit 02, the compensation drive circuit 03, and the reset drive circuit 04 that are coupled to the same row of pixels P1 are arranged sequentially in the pixel row direction X2, the scan drive circuit 01 being disposed on a side distal to the pixels P1. Referring to FIG. 1, this means that the scan drive circuit 01 is disposed on the left side, farthest away from the pixels P1. In the embodiments of the present disclosure, the pixels P1 emit light based on the received gate drive signals, emission control signals, compensation signals, and reset signals. As the gate drive signals are generally defined to scan the pixels to drive the pixels to emit light, the gate drive signals have a greater influence on the emission of pixels P1 compared with other signals. Therefore, the scan drive circuits 01, which provide the gate drive signals, have a significant impact on pixel P1 emission compared with other circuits. Thus, by setting of the scan drive circuit 01 farthest from the pixels P1, signal interference with the scan drive circuit 01 is avoided, ensuring reliable driving of pixel P1 emission.

In addition, in the layout shown in FIG. 1, among the signal lines as coupled in the pixel drive circuit 00, a plurality of signal lines are overlapped with each other, resulting in multiple crossovers. Thus, cutouts K0 are further provided at the overlapping portions of the plurality of signal lines according to the embodiments of the present disclosure. The presence of cutouts K0 reduces the overlapping area between the signal lines at the crossovers, thereby correspondingly reducing the capacitance on the signal lines and lowering signal interference, effectively reducing the interference with signals transmitted to pixels P1.

In summary, the embodiments of the present disclosure provide a pixel drive circuit. The pixel drive circuit includes a plurality of scan drive circuits, a plurality of emission drive circuits, a plurality of compensation drive circuits, and a plurality of reset drive circuits all cascaded in the pixel column direction. The scan drive circuits are configured to transmit gate drive signals to the pixels via gate lines, the emission drive circuits are configured to transmit emission control signals to the pixels via emission control lines, the compensation drive circuits are configured to transmit compensation signals to the pixels via compensation lines, and the reset drive circuits are configured to transmit reset signals to the pixels via reset lines to drive the pixels to emit light. In addition, the scan drive circuit, the emission drive circuit, the compensation drive circuit, and the reset drive circuit corresponding to the same row of pixels are arranged sequentially in the pixel row direction, the scan drive circuit being disposed farthest away from the pixels. Moreover, among the signal lines coupled to the pixel drive circuit, a plurality of signal lines is overlapped with each other, and cutouts are provided at the overlapping portions of the plurality of signal lines. Thus, it can not only reduce the impact of signal interference on the scan drive circuit but can also reduce the overlapping area between signal lines and decrease the capacitance on the signal lines. As a result, it effectively lowers the interference with the signals transmitted to the pixels, ensuring reliable driving of pixel emission.

Figure 2:
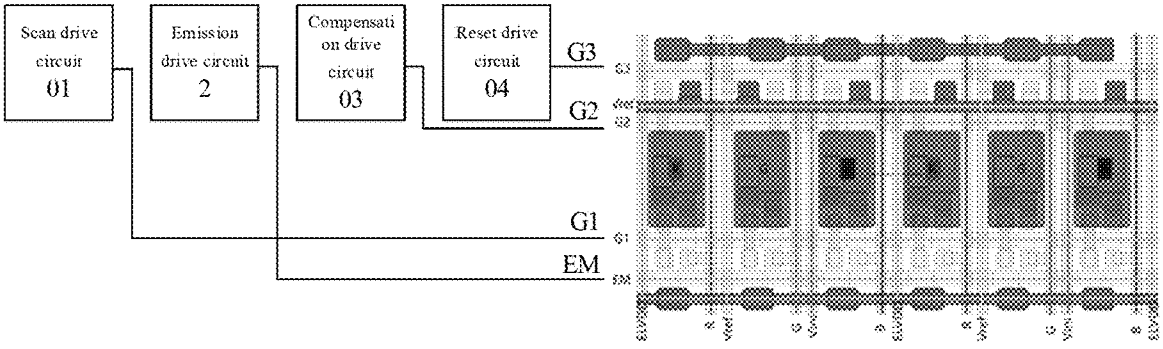
FIG. 2 is a partial layout diagram of a pixel drive circuit according to some embodiments of the present disclosure.

In some embodiments, FIG. 2 shows the various drive circuits coupled to one row of pixels on the basis of FIG. 1. As can be seen from FIGS. 1 and 2, along the pixel row direction X2, the scan drive circuit 01, the emission drive circuit 02, the compensation drive circuit 03, and the reset drive circuit 04 that are coupled to the same row of pixels P1 are arranged sequentially in a direction proximal to the pixels P1. Referring to FIG. 2, at the right-most circuit position (i.e., at the reset drive circuit 04), a space for three wires needs to be reserved for laying out the gate line G1, the emission control line EM, and the compensation line G2. While at the left-most circuit position (i.e., at the scan drive circuit 01), no wiring space needs to be reserved, resulting in most layout space. Taking both factors into account, arranging the scan drive circuit 01, the emission drive circuit 02, the compensation drive circuit 03, and the reset drive circuit 04 as shown in FIG. 2 allows for the optimal utilization of layout space.

In some embodiments, as can also be seen from FIG. 2, one row of pixels P1 includes a plurality of red (R) pixels, a plurality of green (G) pixels, and a plurality of blue (B) pixels. Each pixel P1 is further coupled to other signal lines, such as power supply line ELVDD, reference power supply line Vref, and initial power supply line Vinit, and reliably emits light based on the signals provided by the coupled signal lines.

In some embodiments of the present disclosure, the compensation drive circuit 03 and the reset drive circuit 04 are of the same structure. Based on this, the accompanying drawings illustrated in the following embodiments show the structure of the compensation drive circuit 03 and the reset drive circuit 04 using a PWM circuit as an example.

Figure 3:
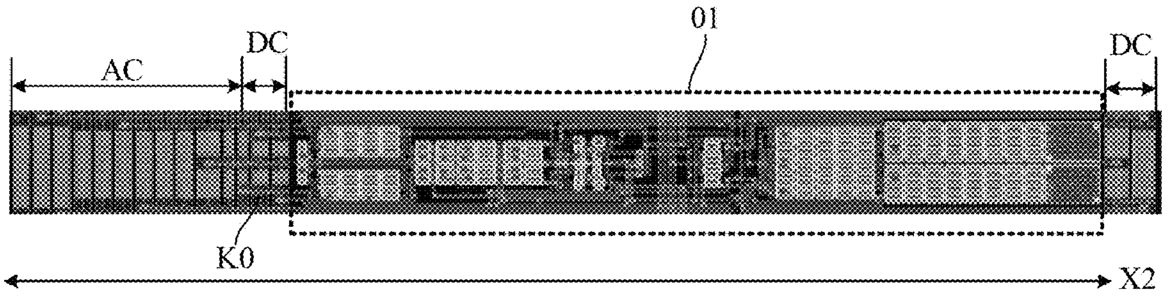
FIG. 3 is a layout diagram of a scan drive circuit according to some embodiments of the present disclosure.
Figure 4:
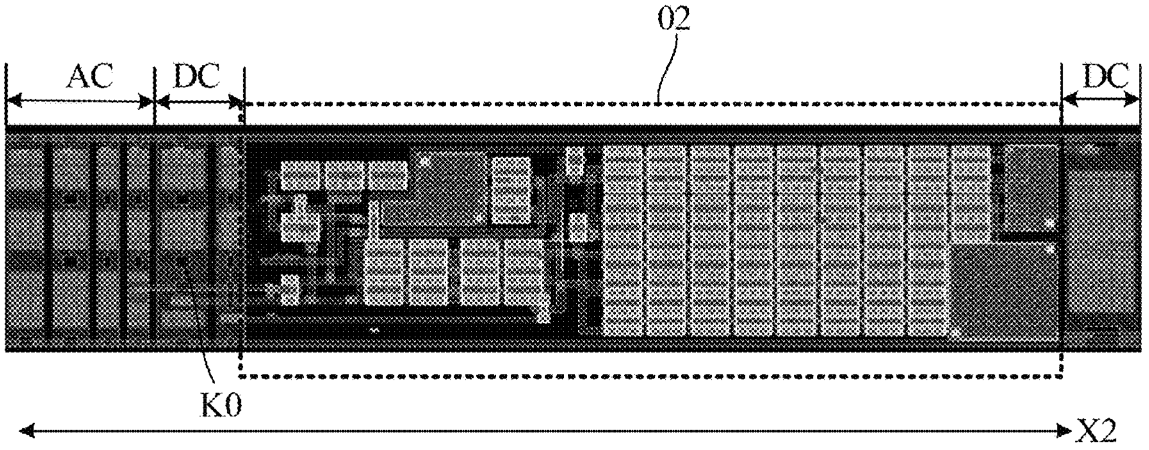
FIG. 4 is a layout diagram of an emission drive circuit according to some embodiments of the present disclosure.
Figure 5:
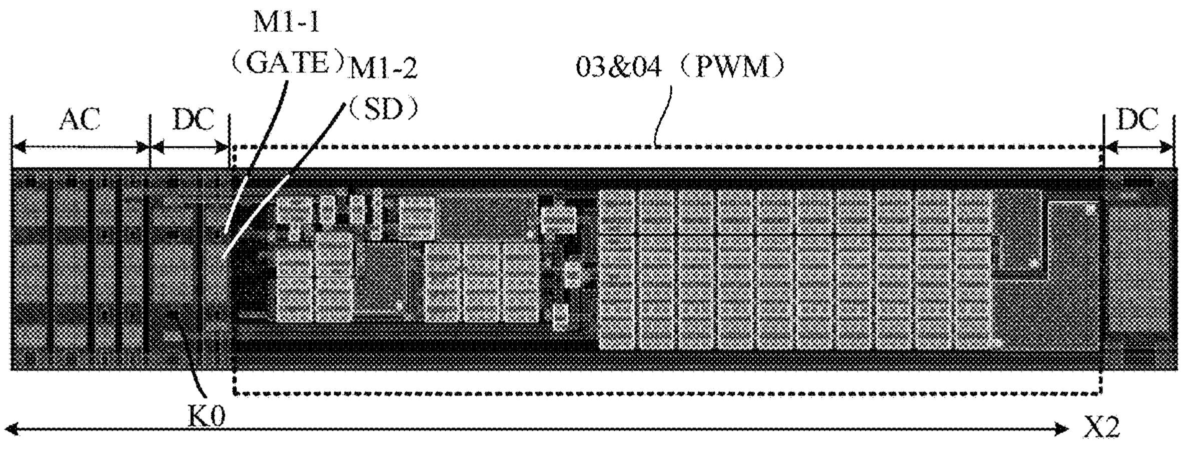
FIG. 5 is a layout diagram of a compensation drive circuit and reset drive circuit according to some embodiments of the present disclosure.

In some embodiments, FIG. 3 is a layout diagram of a scan drive circuit according to some embodiments of the present disclosure. FIG. 4 is a layout diagram of an emission drive circuit according to some embodiments of the present disclosure. FIG. 5 is a layout diagram of a PWM circuit (i.e., the compensation drive circuit 03 and the reset drive circuit 04) according to some embodiments of the present disclosure.

As can be seen from FIGS. 3 to 5, in the embodiments of the present disclosure, each of the scan drive line L1, the emission drive line L2, the compensation drive line L3, and the reset drive line L4 includes a direct current (DC) drive line for providing a DC signal and an alternating current (AC) drive line for providing an AC signal.

In addition, as can also be seen from FIGS. 3 to 5, for the scan drive circuit 01, the emission drive circuit 02, the compensation drive circuit 03, and the reset drive circuit 04, the DC drive lines coupled to each of the drive circuits are disposed on both sides of the drive circuit in the pixel row direction X2, and the AC drive line coupled to each of the drive circuits is disposed on one side distal to the drive circuit of the DC drive line.

For example, taking the scan drive circuit 01 as an example, as can be seen from FIG. 3, the DC drive lines coupled to the scan drive circuit 01 are disposed on both the left and right sides of the scan drive circuit 01. The AC drive line coupled to the scan drive circuit 01 is disposed on the left side distal to the scan drive circuit 01 of the DC drive line coupled to the scan drive circuit 01. That is, the arrangement order in the pixel row direction X2 is as follows: the AC drive line is followed by the DC drive line, then the scan drive circuit 01, and finally another DC drive line. Similar arrangements apply to the other circuits, which is not repeated herein.

By setting of the DC drive lines coupled to each of the drive circuits on both sides of the drive circuit in the pixel row direction X2 and the AC drive lines on one side distal to the drive circuit of the DC drive lines, signal interference on the operation of the drive circuits is blocked, further avoiding the interference with signals transmitted to the pixels P1.

Figure 6:
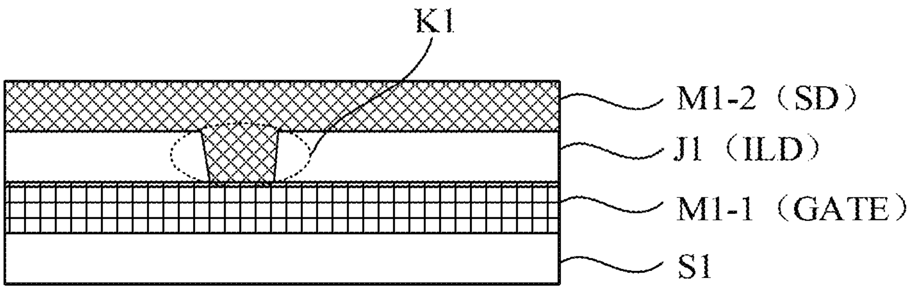
FIG. 6 is a schematic diagram of a film layer structure of a signal line according to some embodiments of the present disclosure.

In some embodiments, as can be seen from the cross-sectional view of a signal line shown in FIGS. 5 and 6, firstly, the pixel drive circuit 00 and the pixels P1 are both disposed on the same side of the substrate (not shown). Secondly, each of the drive lines (including the DC drive line and the AC drive line) includes a plurality of metal layers M1 sequentially stacked along the direction away from the substrate S1, and an insulating layer J1 further disposed between every two adjacent metal layers M1, every two adjacent metal layers M1 being interconnected through a via hole K1 penetrating through the insulating layer J1. That is, a signal line is formed using a plurality of metal layers. Thus, the resistance on the signal line is reduced, and interference is further avoided.

Exemplarily, each of the drive lines shown in FIGS. 5 and 6 includes two metal layers M1 (identified as M1-1 and M1-2, respectively) sequentially stacked along the direction away from the substrate S1. That is, each signal line is formed using two metal layers M1.

In some embodiments of the present disclosure, the pixel P1 includes a gate (GATE) metal layer, an inter-layer di-electric (ILD) layer, and a source-drain (SD) metal layer sequentially stacked along the direction away from the substrate. On this basis, as can also be seen from FIGS. 5 and 6, within the two metal layers M1 for forming the signal lines, one metal layer M1-1 is disposed on the same layer as the GATE layer, while the other metal layer M1-2 is disposed on the same layer as the SD metal layer. Accordingly, the insulating layer J1 between the two metal layers M1 is disposed on the same layer as the ILD layer (shown only in FIG. 6).

"Disposed on the same layer" refers to using the same film formation process to form a film layer of specific patterns, and then the same mask is used in a photolithography process to patternize the film layer and form a layered structure. Depending on the specific pattern, a photolithography process involves multiple exposures, development, or etching process, and the specific patterns formed in the layered structure are either continuous or discontinuous. That is, a plurality of elements, components, structures, and/or portions disposed "on the same layer" are made of the same material and formed through the same photolithography process. This allows for saving on manufacturing processes and costs and increases manufacturing efficiency.

In some embodiments, as can also be seen from FIG. 5, in the embodiments of the present disclosure, the cutout K0 is provided on the GATE metal layer forming the signal line to reduce the overlapping area between signal lines in the crossover portions. That is, the cutout K0 as described in the previous embodiments is formed on the GATE metal layer.

Figure 7:
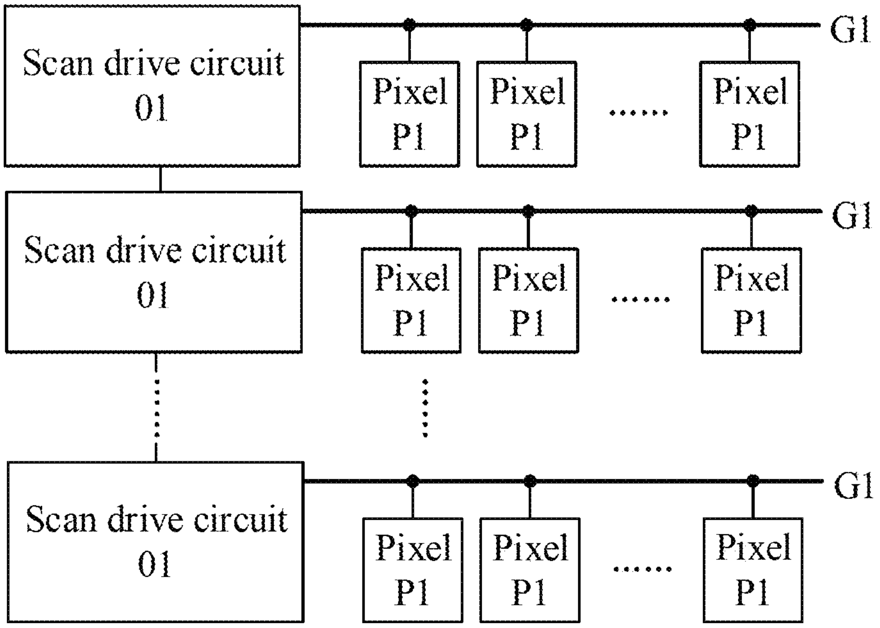
FIG. 7 is a schematic diagram of a scan drive circuit coupled to pixels according to some embodiments of the present disclosure.

In some embodiments of the present disclosure, as can be seen from FIG. 7, a plurality of scan drive circuits 01 are coupled to the plurality of rows of pixels P1 in one-to-one correspondence. That is, each of the scan drive circuits 01 is coupled to one row of pixels P1 via one gate line G1, and the scan drive circuits 01 are coupled to different rows of pixels P1 via different gate lines G1. Accordingly, the number of the plurality of rows of pixels P1 is equal to the number of the plurality of gate lines G1, and is equal to the number of the plurality of scan drive circuits 01. Thus, this allows for reliable row-by-row driving of a plurality of rows of pixels P1. That is, the scan drive circuit 01 transmits gate drive signals to the plurality of rows of pixels P1 row by row in a one-to-one manner.

In some embodiments of the present disclosure, a plurality of emission drive circuits 02 are coupled to a plurality of rows of pixels P1 in one-to-one correspondence, similar to the arrangement of the plurality of scan drive circuits 01. That is, each of the emission drive circuits 02 is coupled to one row of pixels P1 via one emission control line EM, and the emission drive circuits 02 are coupled to different rows of pixels P1 via different emission control lines EM. Accordingly, the number of a plurality of rows of pixels P1 is equal to the number of the plurality of emission control lines EM, and is equal to the number of the plurality of emission drive circuits 02. That is, the emission drive circuit 02 transmits emission control signals to a plurality of rows of pixels P1 in a one-to-one manner. Alternatively, each of the emission drive circuits 02 is coupled to at least two rows of pixels P1. That is, the emission drive circuit 02 transmits emission control signals to a plurality of rows of pixels P1 in a one-to-many manner.

Figure 8:
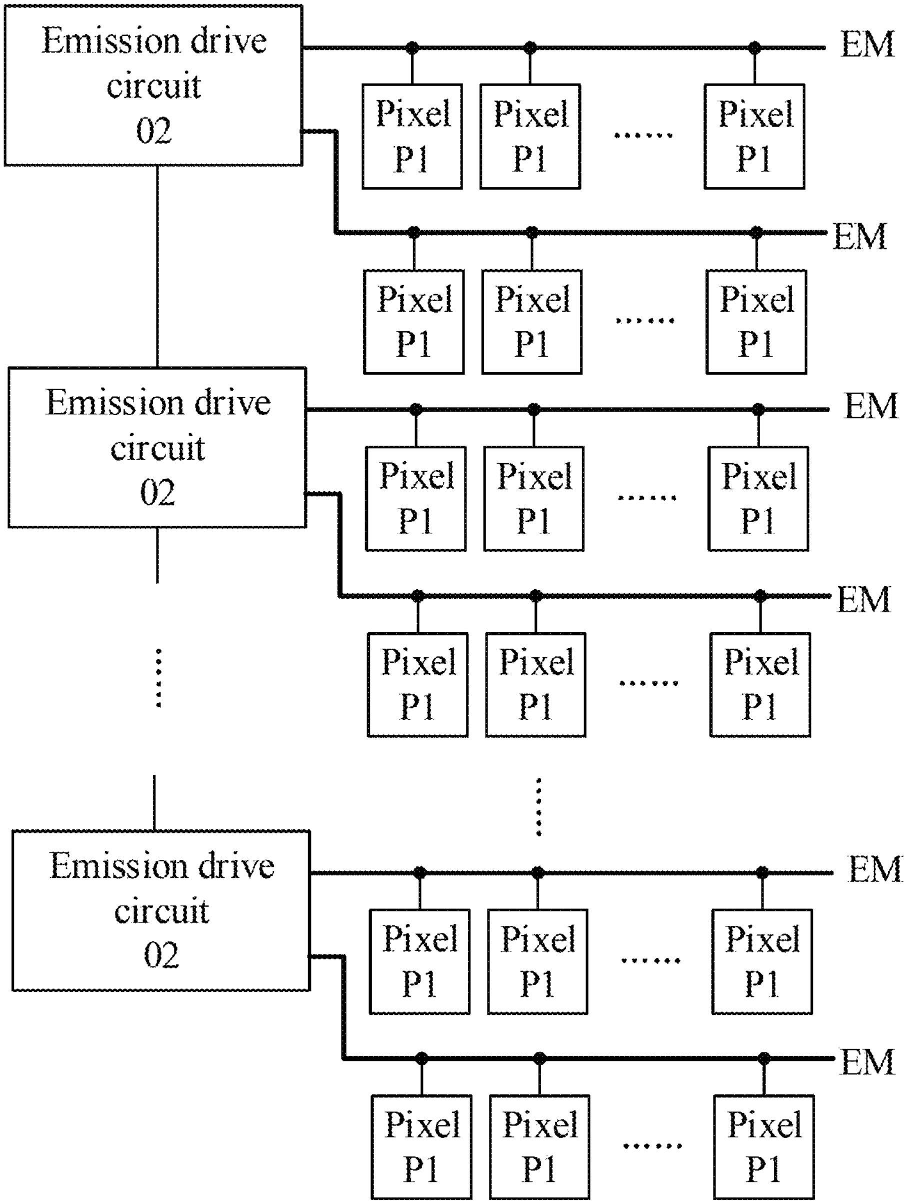
FIG. 8 is a schematic diagram of an emission drive circuit coupled to pixels according to some embodiments of the present disclosure.

For example, referring to FIG. 8, it shows that each of the emission drive circuits 02 is coupled to two adjacent rows of pixels P1 via two emission control lines EM. On this basis, it can be considered that the emission drive circuit 02 transmits the emission control signals to a plurality of rows of pixels P1 in a one-to-two manner. In some embodiments, each of the emission drive circuits 02 is also coupled to four adjacent rows of pixels P1, that is, each of the emission drive circuits is coupled to four adjacent rows of pixels P1 via four emission control lines EM. On this basis, it can be considered that the emission drive circuit 02 transmits the emission control signals to a plurality of rows of pixels P1 in a one-to-four manner.

Likewise, a plurality of compensation drive circuits 03 are coupled to a plurality of rows of pixels P1 in one-to-one correspondence, similar to the arrangement of the plurality of scan drive circuits 01. That is, each of the compensation drive circuits 03 is coupled to one row of pixels P1 via a compensation line G2, and the compensation drive circuits 03 are coupled to different rows of pixels P1 via different compensation lines G2. Accordingly, the number of a plurality of rows of pixels P1 is equal to the number of the plurality of compensation lines G2, and is equal to the number of the plurality of compensation drive circuits 03. Alternatively, each of the compensation drive circuits 03 is coupled to at least two rows of pixels P1. That is, the compensation drive circuit 03 transmits compensation signals to a plurality of rows of pixels P1 in a one-to-many manner.

Figure 9:
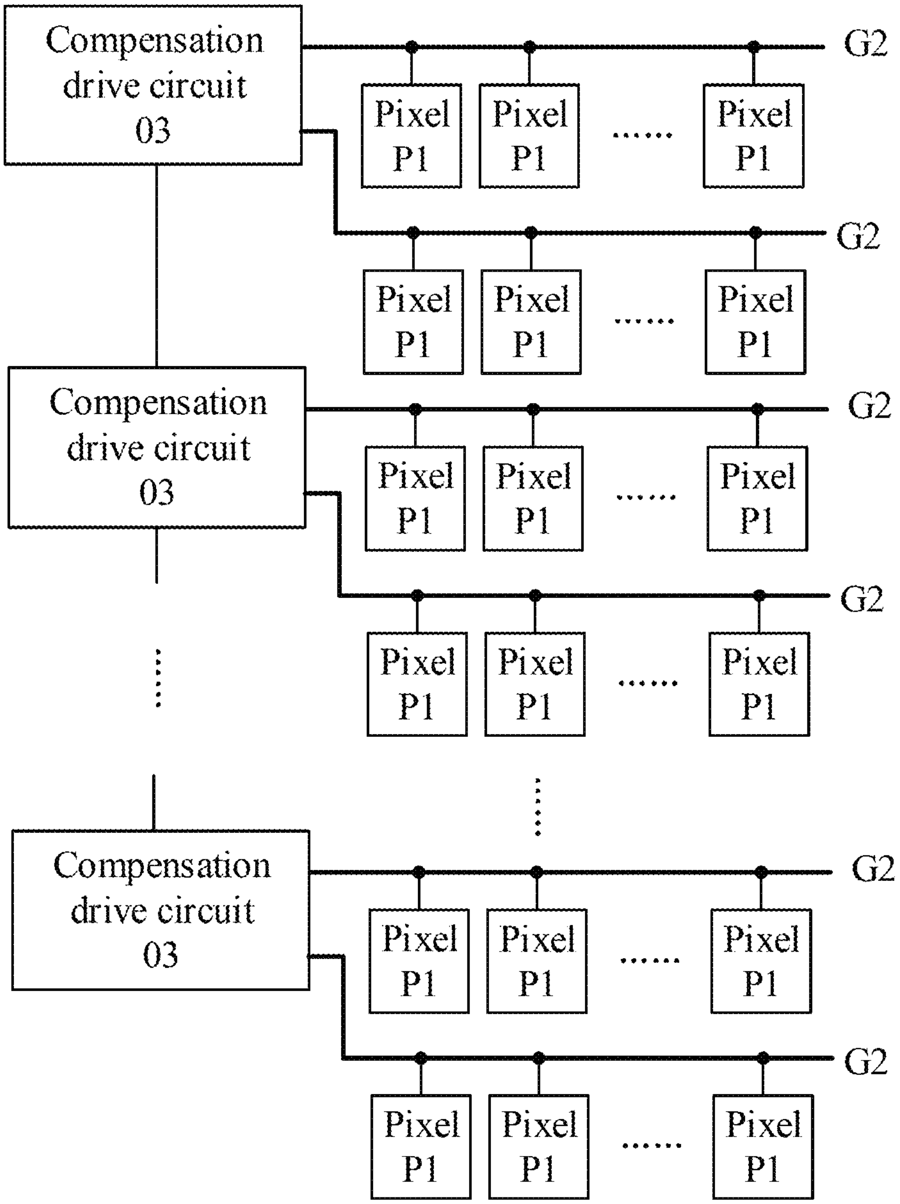
FIG. 9 is a schematic diagram of a compensation drive circuit coupled to pixels according to the embodiments of the present disclosure.

For example, referring to FIG. 9, it shows that each of the compensation drive circuits 03 is coupled to two adjacent rows of pixels P1 via two compensation lines G2. On this basis, it can be considered that the compensation drive circuit 03 transmits the compensation signals to a plurality of rows of pixels P1 in a one-to-two manner. In some embodiments, each of the compensation drive circuits 03 is also coupled to four adjacent rows of pixels P1, that is, each of the compensation drive circuits is coupled to four adjacent rows of pixels P1 via four compensation lines G2. On this basis, it can be considered that the compensation drive circuit 03 transmits the compensation signals to a plurality of rows of pixels P1 in a one-to-four manner.

Likewise, a plurality of reset drive circuits 04 are coupled to a plurality of rows of pixels P1 in one-to-one correspondence, similar to the arrangement of the plurality of scan drive circuits 01. That is, each of the reset drive circuits 04 is coupled to one row of pixels P1 via a reset line G3, and the reset drive circuits 04 are coupled to different rows of pixels P1 via different reset lines G3. Accordingly, the number of a plurality of rows of pixels P1 is equal to the number of the plurality of reset lines G3, and is equal to the number of the plurality of reset drive circuits 04. Alternatively, each of the reset drive circuits 04 is coupled to at least two rows of pixels P1. That is, the reset drive circuit 04 transmits reset signals to a plurality of rows of pixels P1 in a one-to-many manner.

Figure 10:
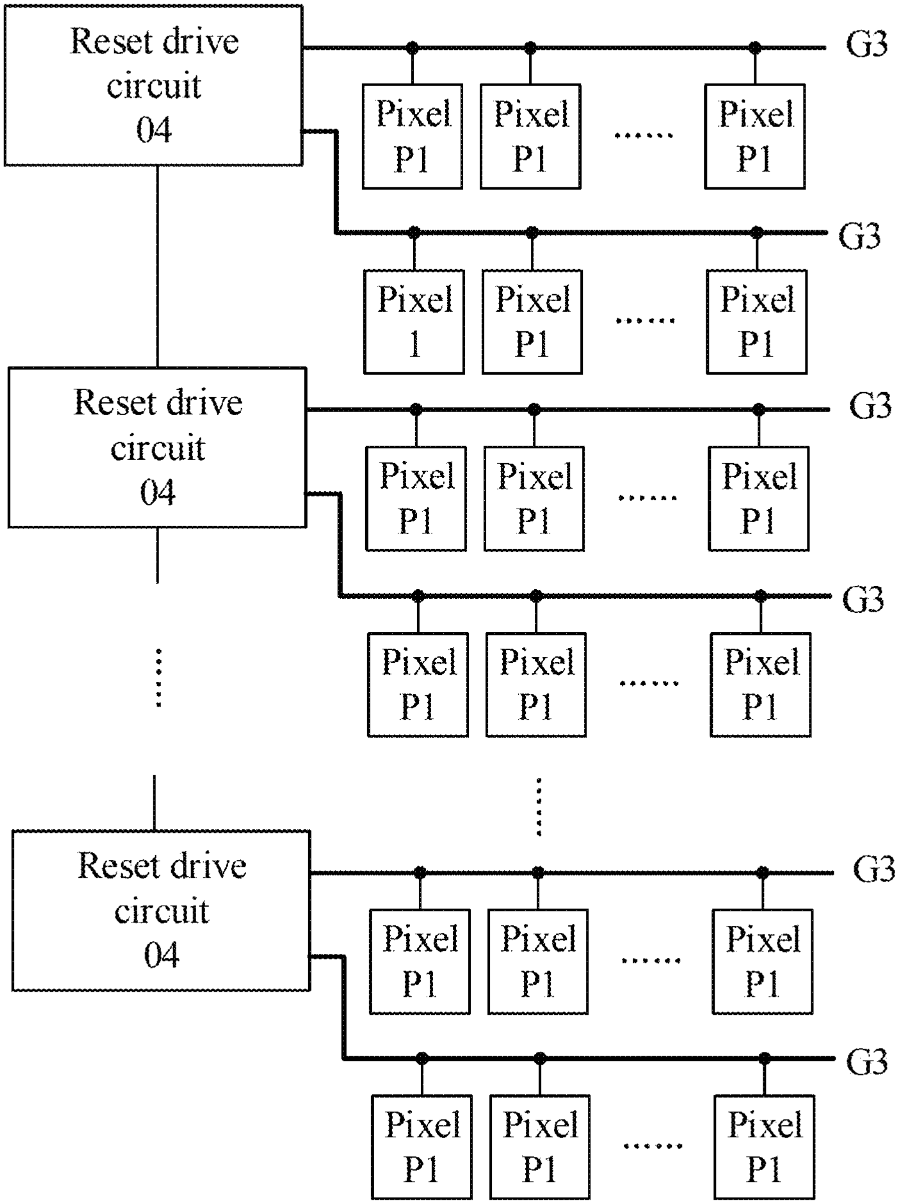
FIG. 10 is a schematic diagram of a reset drive circuit coupled to pixels according to some embodiments of the present disclosure.

For example, referring to FIG. 10, it shows that each of the reset drive circuits 04 is coupled to two adjacent rows of pixels P1 via two reset lines G3. On this basis, it can be considered that the reset drive circuit 04 transmits the reset signals to a plurality of rows of pixels P1 in a one-to-two manner. In some embodiments, each of the reset drive circuits 04 is also coupled to four adjacent rows of pixels P1, that is, each of the reset drive circuits is coupled to four adjacent rows of pixels P1 via four reset lines G3. On this basis, it can be considered that the reset drive circuit 04 transmits the reset signals to a plurality of rows of pixels P1 in a one-to-four manner.

By setting of one emission control circuit 02 to drive one row of pixels, and setting of one compensation drive circuit 03 and one reset drive circuit 04 (i.e., a PWM circuit) to drive one row of pixels, the RC value at the output terminal of each of the drive circuits is reduced, thereby decreasing the rise time (Tr) and the fall time (Tf) of the output signal (e.g., gate drive signal). By setting of one emission control circuit 02 to drive two adjacent rows of pixels, and setting of one compensation drive circuit 03 and one reset drive circuit 04 (i.e., a PWM circuit) to drive two adjacent rows of pixels, the layout space is maximized while the ease of layout is maintained. By setting of one emission control circuit 02 to drive four adjacent rows of pixels, and setting of one compensation drive circuit 03 and one reset drive circuit 04 (i.e., a PWM circuit) to drive four adjacent rows of pixels, the layout space is further increased.

Figure 11:
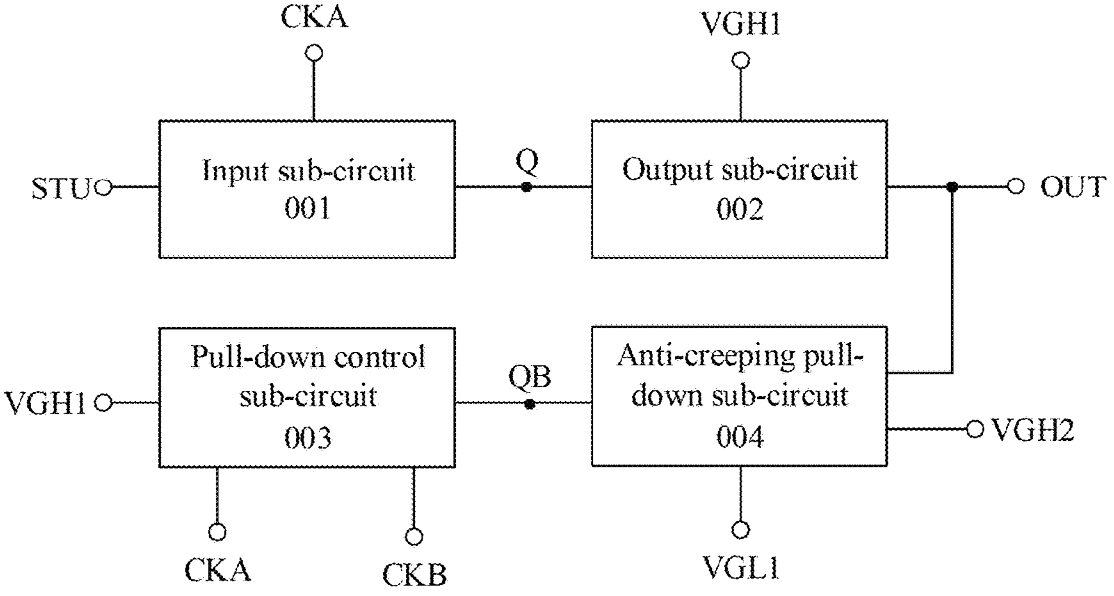
FIG. 11 is a schematic structural diagram of an emission drive circuit, compensation drive circuit, and reset drive circuit according to some embodiments of the present disclosure.

In some embodiments, FIG. 11 is a schematic structural diagram of the drive circuit according to the embodiments of the present disclosure. As shown in FIG. 10, in the embodiments of the present disclosure, each of the emission drive circuit 02, the compensation drive circuit 03, and the reset drive circuit 04 includes an input sub-circuit 001, an output sub-circuit 002, a pull-down control sub-circuit 003, and an anti-creeping pull-down sub-circuit 004.

The input sub-circuit 001 is coupled to the first clock terminal CKA, the input terminal STU, and the pull-up node Q, respectively, and is configured to control the potential of the pull-up node Q based on the first clock signal provided by the first clock terminal CKA and the input signal provided by the input terminal STU.

For example, in the case that the potential of the first clock signal provided by the first clock terminal CKA is the first potential, the input sub-circuit 001 controls the conduction between the input terminal STU and the pull-up node Q, allowing the transmission of the input signal from the input terminal STU to the pull-up node Q to charge the pull-up node Q. Moreover, in the case that the potential of the first clock signal is the second potential, the input sub-circuit 001 controls the input terminal STU to be decoupled from the pull-up node Q.

In some embodiments, the first potential is an active potential, and the second potential is an inactive potential. The first potential is a higher potential relative to the second potential. In the embodiments, the transistors in the circuit are N-type transistors that turn on in response to a high potential and turn off in response to a low potential. In some embodiments, the transistors are P-type transistors, and in this case, the first potential is a low potential relative to the second potential.

The output sub-circuit 002 is coupled to the pull-up node Q, the first power supply terminal VGH1, and the output terminal OUT, respectively, and is configured to control the potential of the output terminal OUT based on the potential of the pull-up node Q and the first power supply signal provided by the first power supply terminal VGH1.

For example, in the case that the potential of the pull-up node Q is the first potential, the output sub-circuit 002 controls the conduction between the first power supply terminal VGH1 and the output terminal OUT. In this case, it allows the transmission of the first power supply signal from the first power supply terminal VGH1 to the output terminal OUT, with the potential of the first power supply signal being high potential. Moreover, in the case that the potential of the pull-up node Q is the second potential, the output sub-circuit 002 controls the first power supply terminal VGH1 to be decoupled from the output terminal OUT.

The pull-down control sub-circuit 003 is coupled to the first power supply terminal VGH1, the first clock terminal CKA, the second clock terminal CKB, and the pull-down node QB, respectively, and is configured to control the potential of the pull-down node QB based on the first power supply signal, the first clock signal, and the second clock signal provided by the second clock terminal CKB.

For instance, in the case that the potential of the first clock signal is the first potential, the pull-down control sub-circuit 003, based on the first power supply signal, controls the conduction between the second clock terminal CKB and the pull-down node QB, allowing the transmission of the second clock signal from the second clock terminal CKB to the pull-down node QB. Moreover, in the case that the potential of the first clock signal is the second potential, the pull-down control sub-circuit 003 controls the second clock terminal CKB to be decoupled from the pull-down node QB.

The anti-creeping pull-down sub-circuit 004 is coupled to the pull-down node QB, the second power supply terminal VGL1, the third power supply terminal VGH2, and the output terminal OUT, respectively, and is configured to control the potential of the output terminal OUT based on the potential of the pull-down node QB, the second power supply signal provided by the second power supply terminal VGL1, and the third power supply signal provided by the third power supply terminal VGH2.

For example, in the case that the potential of the pull-down node QB is the first potential, the anti-creeping pull-down sub-circuit 004, based on the second power supply signal and the third power supply signal, controls the conduction between the second power supply terminal VGL1 and the output terminal OUT, allowing the transmission of the second power supply signal from the second power supply terminal VGL1 to the output terminal OUT. Moreover, in the case that the potential of the pull-down node QB is the second potential, the anti-creeping pull-down sub-circuit 004 controls the second power supply terminal VGL1 to be decoupled from the output terminal OUT. In some embodiments, the potential of the second power supply signal is low, and the potential of the third power supply signal is high.

As an alternative implementation, referring to FIG. 11, for the emission drive circuit 02, the compensation drive circuit 03, and the reset drive circuit 04, the output terminal OUT of each of the drive circuits is coupled to the pixels P1 and another stage of cascaded drive circuit, respectively. That is, a separate cascade portion is not set. On this basis, the anti-creeping pull-down sub-circuit 004 is configured to control the potential of the output terminal OUT based on the potential of the output terminal OUT, the potential of the pull-down node QB, the second power supply signal, and the third power supply signal.

For example, in the case that the potentials of the pull-down node QB and the output terminal OUT are both the first potential, the anti-creeping pull-down sub-circuit 004, based on the second power supply signal and the third power supply signal, controls the conduction between the second power supply terminal VGL1 and the output terminal OUT.

Figure 12:
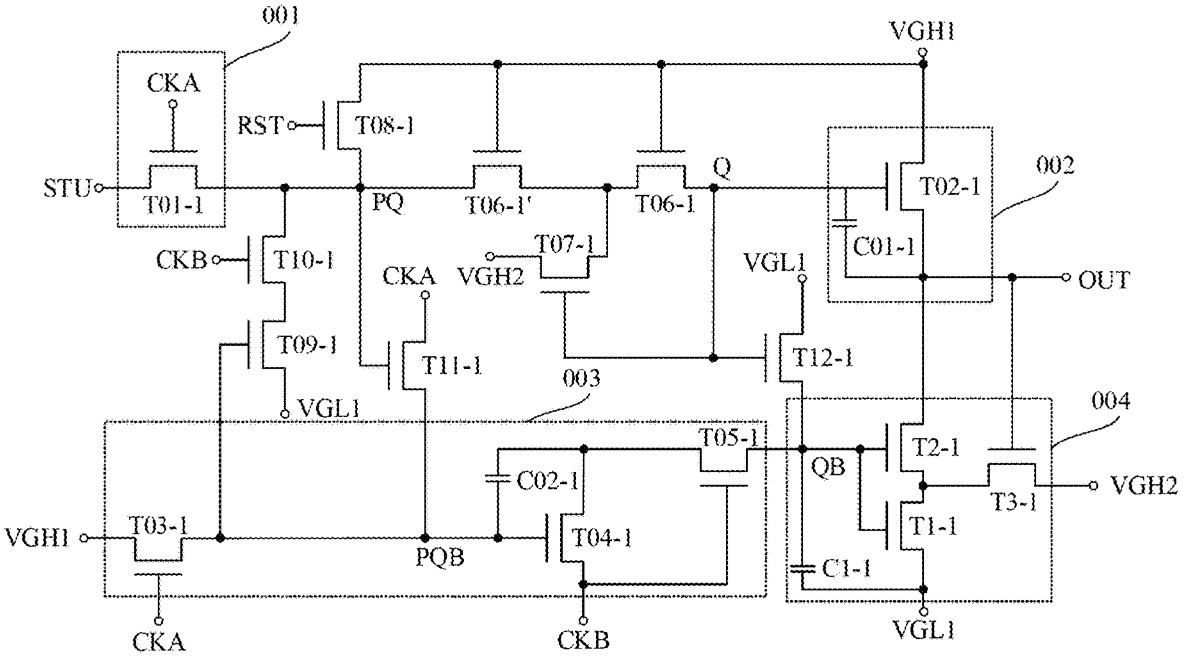
FIG. 12 is a schematic structural diagram of an emission drive circuit based on the structure shown in FIG. 11.
Figure 13:
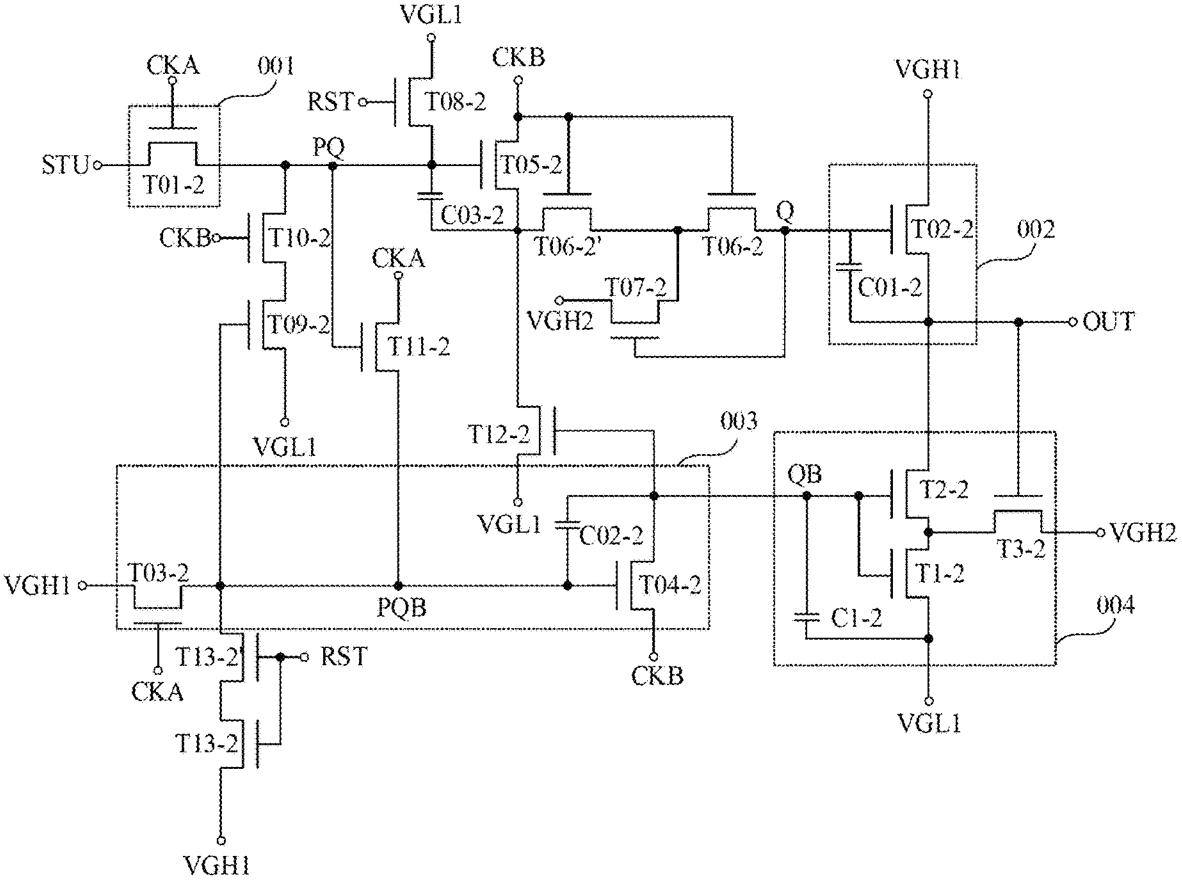
FIG. 13 is a schematic structural diagram of a compensation drive circuit and reset drive circuit based on the structure shown in FIG. 11.

FIGS. 12 and 13 show respectively schematic structural diagrams of another drive circuit based on the structure shown in FIG. 11. FIG. 12 shows the circuit structure of the emission drive circuit 02, and FIG. 13 shows the circuit structure of the compensation drive circuit 03 and the reset drive circuit 04 (i.e., the PWM circuit as described in the above embodiments).

As can be seen from FIGS. 12 and 13, on the basis of FIG. 11, the anti-creeping pull-down sub-circuit 004 includes a first transistor T1, a second transistor T2, a third transistor T3, and a first capacitor C1.

The gates of the first transistor T1 and the second transistor T2 are both coupled to the pull-down node QB, the first electrode of the first transistor T1 is coupled to the second power supply terminal VGL1, the second electrode of the first transistor T1 is coupled to the first electrode of the second transistor T2, and the second electrode of the second transistor T2 is coupled to the output terminal OUT.

The gate of the third transistor T3 is coupled to the output terminal OUT, the first electrode of the third transistor T3 is coupled to the third power supply terminal VGH2, and the second electrode of the third transistor T3 is coupled to the second electrode of the first transistor T1.

One end of the first capacitor C1 is coupled to the pull-down node QB, and the other end of the first capacitor C1 is coupled to the second power supply terminal VGL1.

As can also be seen from FIGS. 12 and 13, the second electrode of the third transistor T3 is actually coupled to the series node of the first transistor T1 and the second transistor T2. In the case that the output sub-circuit 002 controls the first power supply terminal VGH1 to transmit the first power supply signal with a high potential to the output terminal OUT, the third transistor T3 is turned on and transmits the third power supply signal with a high potential to the series node of the first transistor T1 and the second transistor T2, such that the second power supply signal with a low potential provided by the second power supply terminal VGL1 is not transmitted to the output terminal OUT even though the first transistor T1 and/or the second transistor T2 are not completely turned off, achieving the anti-creeping purpose.

It should be noted that, for distinction, in FIG. 12, the various transistors included in the emission drive circuit 02 are identified as "−1", such as identifying the first transistor T1 as "T1-1"; and in FIG. 13, the various transistors included in the compensation drive circuit 03 and the reset drive circuit 04 are identified as "−2", such as identifying the first transistor T1 as "T1-2". Similar identifying convention applies to other devices and the following embodiments, which is not repeated herein.

Figure 14:
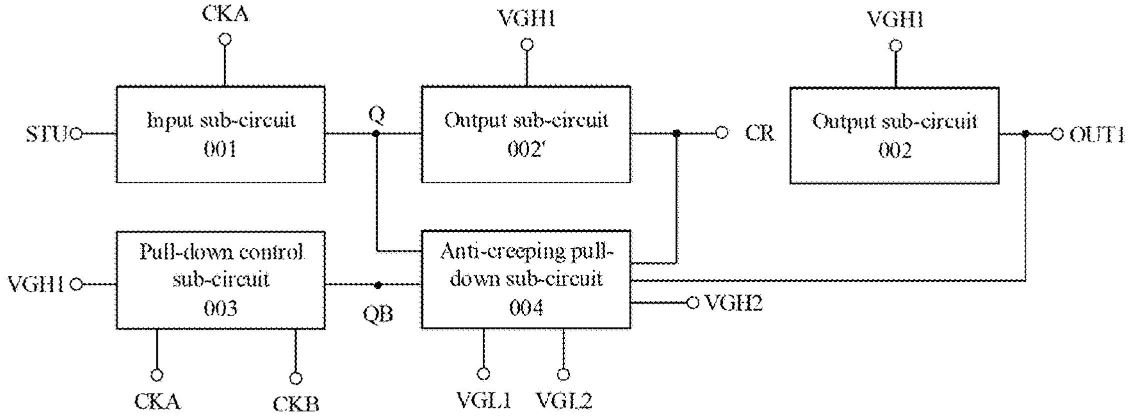
FIG. 14 is a schematic structural diagram of an emission drive circuit, compensation drive circuit, and reset drive circuit according to some other embodiments of the present disclosure.

As another alternative implementation, referring to FIG. 14, for the emission drive circuit 02, the compensation drive circuit 03 and the reset drive circuit 04, the output terminal OUT of each of the drive circuits includes a drive output terminal OUT1 and a shift output terminal CR. The drive output terminal OUT1 is coupled to the pixels P1, and the shift output terminal CR is coupled to another stage of cascaded drive circuit. That is, a cascade portion is separately provided for a plurality of drive circuits to cascade in sequence. Accordingly, as shown in FIG. 13, two output sub-circuits 002 are included to be coupled to the drive output terminal OUT1 and the shift output terminal CR, respectively. For the sake of distinction, the two output sub-circuits 002 are respectively identified as 002' and 002. On this basis, the anti-creeping pull-down sub-circuit 004 is further coupled to the pull-up node Q and the fourth power supply terminal VGL2, respectively, and is configured to control the potential of the shift output terminal CR on the basis of the potential of the pull-up node Q, the potential of the pull-down node QB, the second power supply signal, and the third power supply signal, and controls the potential of the drive output terminal OUT1 on the basis of the potential of the pull-down node QB and the fourth pull-down power supply signal provided by the fourth power supply terminal VGL2.

For example, the anti-creeping pull-down sub-circuit 004 controls the conduction between the second power supply terminal VGL1 and the shift output terminal CR based on the second power supply signal and the third power supply signal in the case that the potential of the pull-down node QB and the potential of the pull-up node Q are both the first potential, such that the second power supply terminal VGL1 transmits the second power supply signal to the shift output terminal CR; and meanwhile, the anti-creeping pull-down sub-circuit 004 controls the conduction between the fourth power supply terminal VGL2 and the output terminal OUT1 based on the potential of the pull-down node QB, such that the fourth power supply terminal VGL2 transmits the fourth power supply signal to the output terminal OUT1. In some embodiments, the potential of the fourth power supply signal is also low. For the structure shown in FIG. 13, it is considered that the potential of the output terminal OUT is controlled using the dual VGL (including the second power supply terminal VGL1 and the fourth power supply terminal VGL2).

Figure 15:
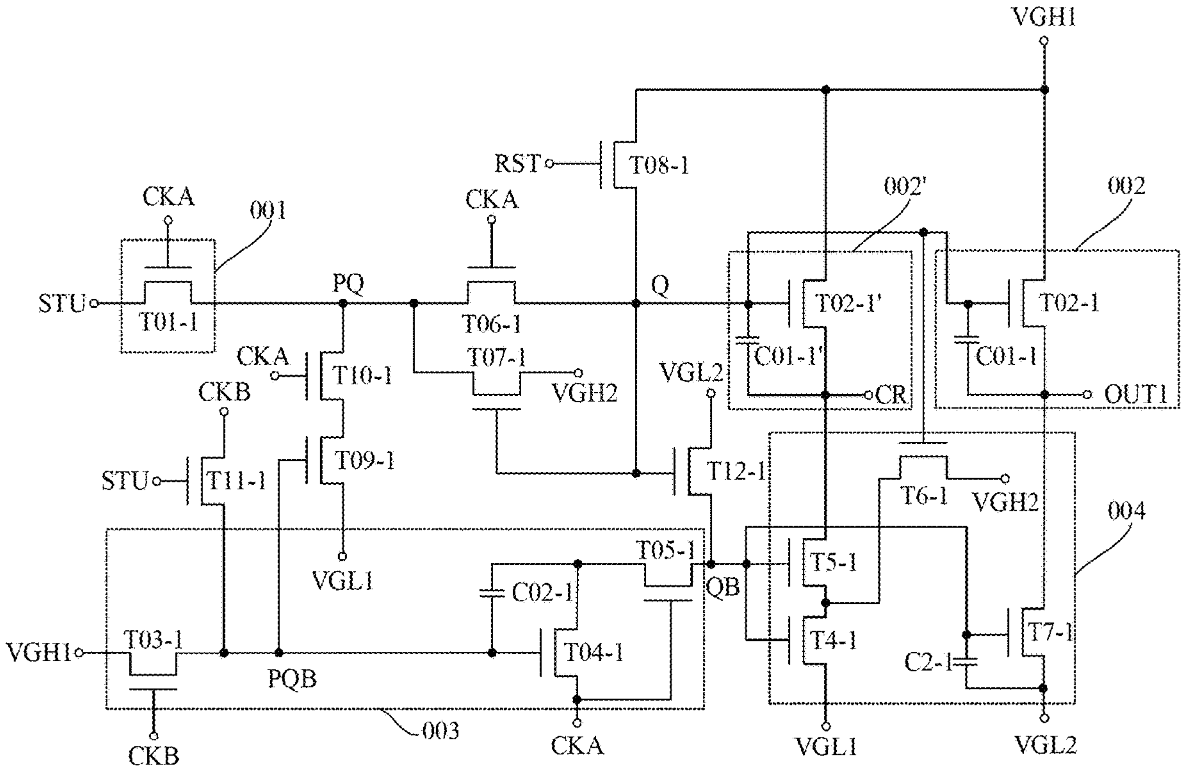
FIG. 15 is a schematic structural diagram of an emission drive circuit based on the structure shown in FIG. 14.
Figure 16:
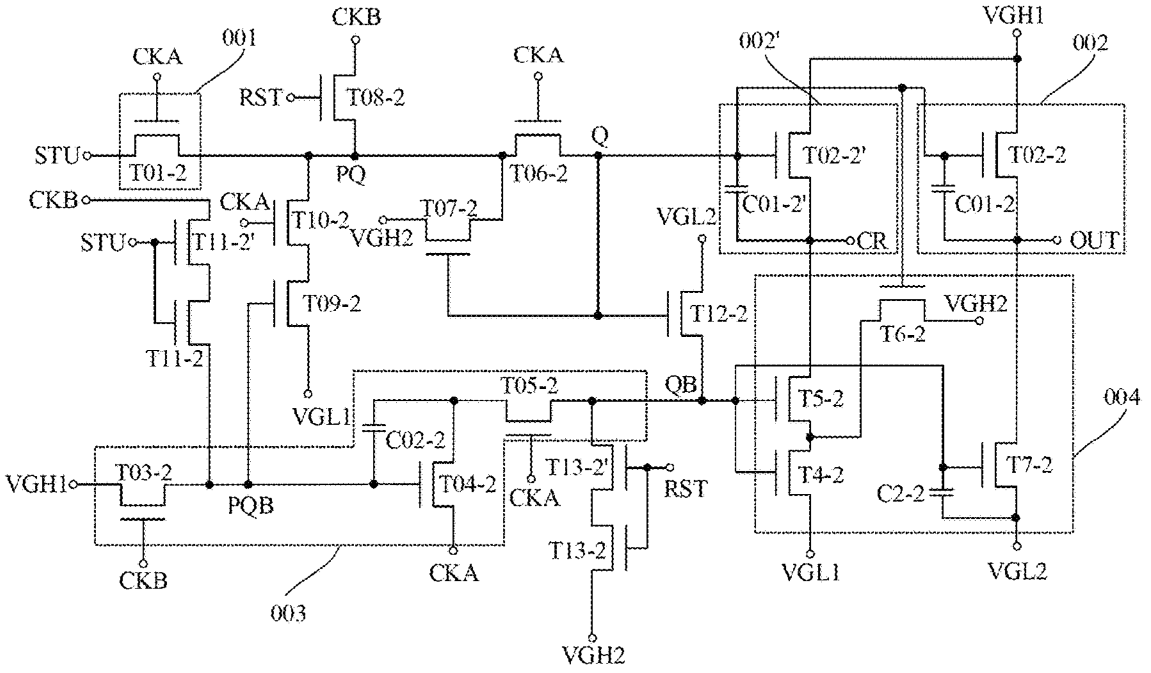
FIG. 16 is a schematic structural diagram of a compensation drive circuit and reset drive circuit based on the structure shown in FIG. 14.

On the basis of FIG. 14, FIGS. 15 and 16 show schematic structural diagrams of still another drive circuit, respectively. FIG. 15 shows the circuit structure of the emission drive circuit 02, and FIG. 16 shows the circuit structure of the compensation drive circuit 03 and the reset drive circuit 04 (i.e., the PWM circuit as described in the above embodiments). As can be seen from FIGS. 15 and 16, the anti-creeping pull-down sub-circuit 004 on the basis of FIG. 14 includes a fourth transistor T4, a fifth transistor T5, a sixth transistor T6, a seventh transistor T7, and a second capacitor C2.

The gates of the fourth transistor T4 and the fifth transistor T5 are both coupled to the pull-down node QB, the first electrode of the fourth transistor T4 is coupled to the second power supply terminal VGL1, the second electrode of the fourth transistor T4 is coupled to the first electrode of the fifth transistor T5, and the second electrode of the fifth transistor T5 is coupled to the shift output terminal CR.

The gate of the sixth transistor T6 is coupled to the pull-up node Q, the first electrode of the sixth transistor T6 is coupled to the third power supply terminal VGH2, and the second electrode of the sixth transistor T6 is coupled to the first electrode of the fifth transistor T5.

The gate of the seventh transistor T7 is coupled to the pull-down node QB, the first electrode of the seventh transistor T7 is coupled to the fourth power supply terminal VGL2, and the second electrode of the seventh transistor T7 is coupled to the drive output terminal OUT1.

One end of the second capacitor C2 is coupled to the pull-down node QB, and the other end of the second capacitor C2 is coupled to the fourth power supply terminal VGL2.

As can also be seen from FIGS. 15 and 16, it is considered that the second electrode of the sixth transistor T6 is coupled to a series node of the fourth transistor T4 and the fifth transistor T5. In the case that the output sub-circuit 002' controls the first power supply terminal VGH1 to transmit the first power supply signal with a high potential to the shift output terminal CR, the sixth transistor T6 is turned on and transmits the third power supply signal with a high potential to the series node of the fourth transistor T4 and the fifth transistor T5, such that the second power supply signal with a low potential provided by the second power supply terminal VGL1 is not transmitted to the shift output terminal CR even though the fourth transistor T4 and/or the fifth transistor T5 is not completely turned off. Meanwhile, the seventh transistor T7 is turned off under the control of the pull-down node QB with a low potential, such that the fourth power supply signal with a low potential provided by the fourth power supply terminal VGL2 is not transmitted to the drive output terminal OUT1, thereby achieving the anti-creeping purpose.

As can also be seen from FIGS. 12, 13, 15, and 16, for the structures shown in FIGS. 11 and 14, for the emission drive circuit 02, the compensation drive circuit 03 and the reset drive circuit 04, the input sub-circuit 001 of each of the drive circuits includes an input transistor T01. The gate of the input transistor T01 is coupled to the first clock terminal CKA, the first electrode of the gate of the input transistor T01 is coupled to the input terminal STU, and the second electrode of the gate of the input transistor T01 is coupled to the pull-up node Q.

As can also be seen from FIGS. 12 and 13, for the structure shown in FIG. 11, for the emission drive circuit 02, the compensation drive circuit 03 and the reset drive circuit 04, the output sub-circuit 002 of each of the drive circuits includes an output transistor T02 and an output capacitor C01. The gate of the output transistor T02 is coupled to the pull-up node Q, the first electrode of the output transistor T02 is coupled to the first power supply terminal VGH1, and the second electrode of the output transistor T02 is coupled to the output terminal OUT. One end of the output capacitor C01 is coupled to the pull-up node Q, and the other end of the output capacitor C01 is coupled to the output terminal OUT.

As can also be seen from FIGS. 15 and 16, for the structure shown in FIG. 14, the two output sub-circuits 002' and 002 each include an output transistor T02 and an output capacitor C01. For the sake of distinction, the output transistor T02 included in one output sub-circuits 002' is identified as T02-1', and the output capacitor C01 is identified as C01-1'; and the output transistor T02 included in the other output sub-circuit 002 is identified as T02-1, and the output capacitor C01 is identified as C01-1.

The gate of the output transistor T02-1' and the gate of the output transistor T02-1 are both coupled to the pull-up node Q, the first electrode of the output transistor T02-1' and the first electrode of the output transistor T02-1 are coupled to the first power supply terminal VGH1, the second electrode of the output transistor T02-1' is coupled to the shift output terminal CR, and the second electrode of the output transistor T02-1 is coupled to the drive output terminal OUT1. One end of the output capacitor C01-1' and one end of the output capacitor C01-1 are both coupled to the pull-up node Q, the other end of the output capacitor C01-1' is coupled to the shift output terminal CR, and the other end of the output capacitor C01-1 is coupled to the drive output terminal OUT1.

In some embodiments, as can also be seen from FIGS. 12, 13, 15, and 16, for the structures shown in FIGS. 11 and 14, for the emission drive circuit 02, the compensation drive circuit 03 and the reset drive circuit 04, the pull-down control sub-circuit 003 of each of the drive circuits includes a pull-down control transistor T03, a pull-down control transistor T04, and a pull-down control capacitor C02.

In the gate of the pull-down control transistor T03 and the first electrode of the pull-down control transistor T04, one electrode is coupled to the first clock terminal CKA, and the other electrode is coupled to the second clock terminal CKB. For example, in the circuits shown in FIGS. 12 and 13, the gate of the pull-down control transistor T03 is coupled to the first clock terminal CKA, and the first electrode of the pull-down control transistor T04 is coupled to the second clock terminal CKB. In the circuits shown in FIGS. 15 and 16, the gate of the pull-down control transistor T03 is coupled to the second clock terminal CKB, and the first electrode of the pull-down control transistor T04 is coupled to the first clock terminal CKA. Moreover, the first electrode of the pull-down control transistor T03 is coupled to the first power supply terminal VGH1, the second electrode of the pull-down control transistor T03 is coupled to the gate of the pull-down control transistor T04, which is identified as the node PQB, and the second electrode of the pull-down control transistor T04 is coupled to the pull-down node QB. One end of the pull-down control capacitor C02 is coupled to the node PQB, and the other end of the pull-down control capacitor C02 is coupled to the pull-down node QB.

Moreover, as can also be seen from FIGS. 12, 15, and 16, each of the emission drive circuit 02, the compensation drive circuit 03, and the reset drive circuit 04 further includes a transistor T05 connected in series between the pull-down node QB and the second electrode of the pull-down control transistor T04. The gate of the transistor T05 is coupled to the first electrode of the pull-down control transistor T04 to share the clock terminal. For the structure shown in FIG. 12, the clock terminal shared herein is the second clock terminal CKB; and for the structures shown in FIGS. 15 and 16, the clock terminal shared herein is the first clock terminal CKA. The first electrode of the transistor T05 is coupled to the first electrode of the pull-down control transistor T04, and the second electrode of the transistor T05 is coupled to the pull-down node QB. The transistor T05 is configured to control the connection and disconnection between the second electrode of the pull-down control transistor T04 and the pull-down node QB based on a clock signal provided by the clock terminal, so as to control the potential of the pull-down node QB.

In some embodiments, as can also be seen from FIGS. 12 and 13, for the structure shown in FIG. 11, each of the emission drive circuit 02, the compensation drive circuit 03, and the reset drive circuit 04 further includes two transistors T06 and T06' connected in series between the pull-up node Q and the input transistor T01.

As can be seen from FIG. 12, in the emission drive circuit 02, the gates of the transistors T06 and T06' are both coupled to the first power supply terminal VGH1, the first electrode of the transistor T06' is coupled to the second electrode of the input transistor T01, which is identified as the node PQ, the second electrode of the transistor T06' is coupled to the first electrode of the transistor T06, and the second electrode of the transistor T06 is coupled to the pull-up node Q. As the potential of the first power supply signal provided by the first power supply terminal VGH1 is maintained high, the transistors T06 and T06' are maintained to be turned on to connect the node PQ to the pull-up node Q.

As can be seen from FIG. 13, in the compensation drive circuit 03 and the reset drive circuit 04, the gates of the transistors T06 and T06' are both coupled to the second clock terminal CKB, and the gate of transistor T05 included in the compensation drive circuit 03 and the reset drive circuit 04 is coupled to the second electrode of the input transistor T01 (i.e., the node PQ), the first electrode of the transistor T05 is coupled to the second clock terminal CKB, and the second electrode of the transistor T05 is coupled to the first electrode of the transistor T06'. The first electrode of the transistor T06 is coupled to the second electrode of the transistor T06', and the second electrode of the transistor T06 is coupled to the pull-up node Q. Moreover, the compensation drive circuit 03 and the reset drive circuit 04 further include a capacitor C03, one end of the capacitor C03 being coupled to the node PQ, and the other end of the capacitor C03 being coupled to the second electrode of the transistor T05. The transistor T05 and the transistors T06 and T06' control the connection and disconnection between the node PQ and the pull-up node Q based on the second clock signal, thereby controlling the potential of the pull-up node Q. The capacitor C03 is configured to store the potential of the node PQ.

In some embodiments, as can also be seen from FIGS. 15 and 16, for the structure shown in FIG. 12, each of the emission drive circuit 02, the compensation drive circuit 03, and the reset drive circuit 04 further includes a transistor T06 connected in series between the pull-up node Q and the input transistor T01. The gate of the transistor T06 is coupled to the first clock terminal CKA, the first electrode of the transistor T06 is coupled to the second electrode of the input transistor T01, which is identified as the node PQ, and the second electrode of the transistor T06 is coupled to the pull-up node Q. The transistor T06 controls the connection and disconnection between the node PQ and the pull-up node Q based on the first clock signal, thereby controlling the potential of the pull-up node Q.

In some embodiments, as can also be seen from FIGS. 12, 13, 15, and 16, each of the emission drive circuit 02, the compensation drive circuit 03, and the reset drive circuit 04 further includes a transistor T07.

In addition, as can be seen from FIGS. 12 and 13, for the structure shown in FIG. 11, the gate of the transistor T07 is coupled to the pull-up node Q, the first electrode of the transistor T07 is coupled to the third power supply terminal VGH2, and the second electrode of the transistor T07 is coupled to the series node of the transistors T06 and T06', so as to control the third power supply terminal VGH2 to transmit a power supply signal with a high potential to the series node of the transistors T06 and T06' in the case that the potential of the pull-up node Q is an active potential, thereby ensuring reliable charging of the pull-up node Q.

As can be seen from FIGS. 15 and 16, for the structure shown in FIG. 14, the gate of the transistor T07 is coupled to the pull-up node Q, the first electrode of the transistor T07 is coupled to the third power supply terminal VGH2, and the second electrode of the transistor T07 is coupled to the node PQ, so as to control the third power supply terminal VGH2 to transmit a power supply signal with a high potential to the node PQ in the case that the potential of the pull-up node Q is an active potential, thereby ensuring reliable charging of the pull-up node Q.

In some embodiments, as can be seen from FIGS. 12, 13, 15, and 16, each of the emission drive circuit 02, the compensation drive circuit 03, and the reset drive circuit 04 further includes a transistor T08.

In addition, as can be seen from FIGS. 12 and 13, for the structure shown in FIG. 11, the gate of the transistor T08 is coupled to the reset signal terminal RST, the second electrode of the transistor T08 is coupled to the node PQ, and the first electrode of the transistor T08 in the emission drive circuit 02 is coupled to the first power supply terminal VGH1 to control the connection and disconnection between the first power supply terminal VGH1 and the node PQ based on the reset signal provided by the reset signal terminal RST, thereby controlling the potential of the node PQ. The first electrode of the transistor T08 in the compensation drive circuit 03 and the reset drive circuit 04 is coupled to the second power supply terminal VGL1 to control the connection and disconnection between the second power supply terminal VGL1 and the node PQ based on the reset signal provided by the reset signal terminal RST, thereby controlling the potential of the node PQ. As can be seen from FIG. 15, for the structure shown in FIG. 14, the gate of the transistor T08 in the emission drive circuit 02 is coupled to the reset signal terminal RST, the first electrode of the transistor T08 is coupled to the first power supply terminal VGH1, and the second electrode of the transistor T08 is coupled to the pull-up node Q, so as to control the connection and disconnection between the first power supply terminal VGH1 and the pull-up node Q based on the reset signal, thereby controlling the potential of the pull-up node Q. As can be seen from FIG. 16, for the structure shown in FIG. 14, the gate of the transistor T08 in the compensation drive circuit 03 and the reset drive circuit 04 is coupled to the reset signal terminal RST, the first electrode of the transistor T08 is coupled to the second clock terminal CKB, and the second electrode of the transistor T08 is coupled to the node PQ, so as to control the connection and disconnection between the second clock terminal CKB and the node PQ based on the reset signal, thereby controlling the potential of the node PQ.

In some embodiments, as can be seen from FIGS. 12, 13, 15, and 16, each of the emission drive circuit 02, the compensation drive circuit 03, and the reset drive circuit 04 further includes a transistor T09, a transistor T10, a transistor T11, and a transistor T12.

In addition, as can be seen from FIGS. 12 and 13, for the structure shown in FIG. 11, the gate of the transistor T09 is coupled to the node PQB, the first electrode of the transistor T09 is coupled to the second power supply terminal VGL1, the second electrode of the transistor T09 is coupled to the first electrode of the transistor T10, the second electrode of the transistor T10 is coupled to the node PQ, and the gate of the transistor T10 is coupled to the second clock terminal CKB. The transistor T09 and the transistor T10 control the connection and disconnection between the second power supply terminal VGL1 and the node PQ based on the potential of the node PQB and the second clock signal, thereby controlling the potential of the node PQ. The gate of the transistor T11 is coupled to the node PQ, the first electrode of the transistor T11 is coupled to the first clock terminal CKA, and the second electrode of the transistor T11 is coupled to the node PQB. The transistor T11 controls the connection and disconnection between the first clock terminal CKA and the node PQB based on the potential of the node PQ, thereby controlling the potential of the node PQB. The gate of the transistor T12 in the emission drive circuit 02 is coupled to the pull-up node Q, the first electrode of the transistor T12 is coupled to the second power supply terminal VGL1, and the second electrode of the transistor T12 is coupled to the pull-down node QB. The transistor T12 controls the connection and disconnection between the second power supply terminal VGL1 and the pull-down node QB based on the potential of the pull-up node Q, thereby controlling the potential of the pull-down node QB. The gate of the transistor T12 in the compensation drive circuit 03 and the reset drive circuit 04 is coupled to the second electrode of the transistor T05, the first electrode of the transistor T12 is coupled to the second power supply terminal VGL1, and the second electrode of the transistor T12 is coupled to the pull-down node QB. The transistor T12 controls the connection and disconnection between the second power supply terminal VGL1 and the pull-down node QB based on the potential of the second electrode of the transistor T05, thereby controlling the potential of the pull-down node QB.

As can be seen from FIGS. 15 and 16, for the structure shown in FIG. 14, the gate of the transistor T09 is coupled to the node PQB, the first electrode of the transistor T09 is coupled to the second power supply terminal VGL1, the second electrode of the transistor T09 is coupled to the first electrode of the transistor T10, the second electrode of the transistor T10 is coupled to the node PQ, and the gate of the transistor T10 is coupled to the first clock terminal CKA. The transistor T09 and the transistor T10 control the connection and disconnection between the second power supply terminal VGL1 and the node PQ based on the potential of the node PQB and the first clock signal, thereby controlling the potential of the node PQ. In the emission drive circuit 02, the gate of the transistor T11 is coupled to the input terminal STU, the first electrode of the transistor T11 is coupled to the second clock terminal CKB, and the second electrode of the transistor T11 is coupled to the node PQB. In the compensation drive circuit 03 and the reset drive circuit 04, the transistor T11 includes two transistors connected in series, which are identified as T11 and T11', respectively, the gates of the transistors T11 and T11' are both coupled to the input terminal STU, the first electrode of the transistor T11 is coupled to the node PQB, the second electrode of the transistor T11 is coupled to the second electrode of the transistor T11', and the first electrode of the transistor T11' is coupled to the second clock terminal CKB. The transistor T11 controls the connection and disconnection between the second clock terminal CKB and the node PQB based on the input signal, thereby controlling the potential of the node PQB. The gate of the transistor T12 is coupled to the pull-up node Q, the first electrode of the transistor T12 is coupled to the fourth power supply terminal VGL2, and the second electrode of the transistor T12 is coupled to the pull-down node QB. The transistor T12 controls the connection and disconnection between the fourth power supply terminal VGL2 and the pull-down node QB based on the potential of the pull-up node Q, thereby controlling the potential of the pull-down node QB.

In some embodiments, as can be seen from FIGS. 13 and 16, for the structures shown in FIGS. 11 and 14, on the premise that cascade portions are separately provided, each of the compensation drive circuit 03 and the reset drive circuit 04 further includes two transistors T13 and T13' connected in series.

As can be seen from FIG. 13, for the structure shown in FIG. 11, in the compensation drive circuit 03 and the reset drive circuit 04, the gates of the two transistors T13 and T13' connected in series are coupled to the reset signal terminal RST, the first electrode of the transistor T13 is coupled to the first power supply terminal VGH1, the second electrode of the transistor T13 is coupled to the first electrode of the transistor T13', and the second electrode of the transistor T13' is coupled to the node PQB. The two transistors T13 and T13' are configured to control the connection and disconnection between the first power supply terminal VGH1 and the node PQB based on a reset signal, thereby controlling the potential of the node PQB.

As can be seen from FIG. 16, for the structure shown in FIG. 14, in the compensation drive circuit 03 and the reset drive circuit 04, the gates of the two transistors T13 and T13' connected in series are coupled to the reset signal terminal RST, the first electrode of the transistor T13 is coupled to the fourth power supply terminal VGH2, the second electrode of the transistor T13 is coupled to the first electrode of the transistor T13', and the second electrode of the transistor T13' is coupled to the pull-down node QB. The two transistors T13 and T13' are configured to control the connection and disconnection between the fourth power supply terminal VGH2 and the pull-down node QB based on a reset signal, thereby controlling the potential of the pull-down node QB.

Figure 17:
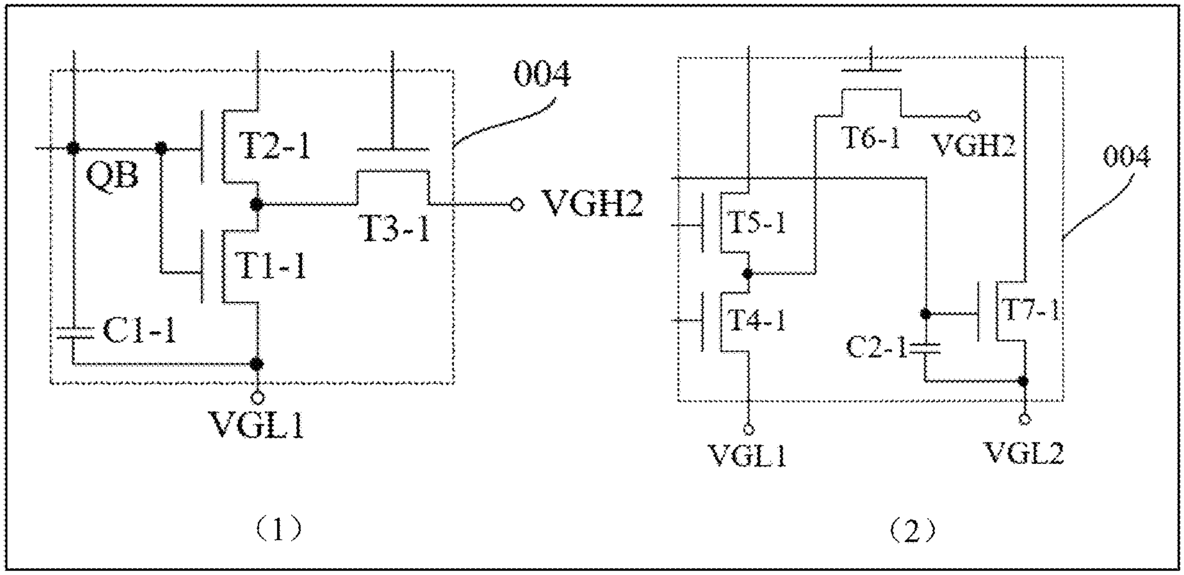
FIG. 17 is a schematic structural diagram of an anti-creeping pull-down sub-circuit based on the structure shown in FIGS. 11 to 16.

That is, as an alternative implementation, on the basis of the structure shown in FIG. 11, the emission drive circuit 02 is of a 16T3C structure (i.e., including 16 transistors and 3 capacitors) as shown in FIG. 12, and the compensation drive circuit 03 and the reset drive circuit 04 are both of the same 17T4C structure. As an alternative implementation, on the basis of the structure shown in FIG. 12, the emission drive circuit 02 is of a 17T3C structure as shown in FIG. 14, and the compensation drive circuit 03 and the reset drive circuit 04 are both of the same 18T4C structure. In some embodiments, other structures, such as 15T2C, are also adopted, which is not limited in the embodiments of the present disclosure, as long as the anti-creeping pull-down sub-circuit 004 is included. Two alternative implementations described in the embodiments of the present disclosure are referred to as Split1 and Split2, respectively. In a display apparatus, the structure of Split1 or Split2 is adopted. As can be further seen from FIG. 17, the structures of Split1 and Split2 are different in the design of the anti-creeping portion. The corresponding Split1 structure based on the structure shown in FIG. 11 adopts three transistors and a capacitor, and reliable anti-creeping is performed through a high-voltage setting (e.g., the design of the fourth power supply terminal VGH2). The corresponding Split2 structure based on the structure shown in FIG. 13 adopts four transistors and one capacitor, and reliable anti-creeping is performed through double VGLs (including VGL1 and VGL2).

Figure 18:
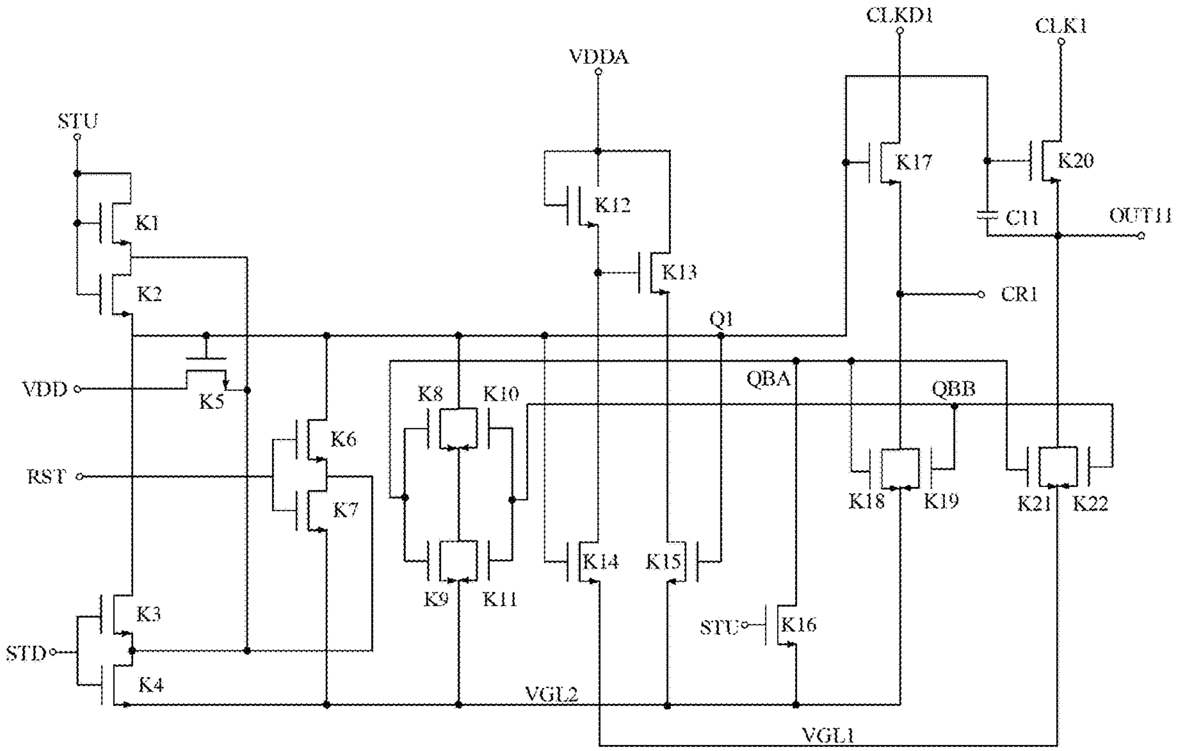
FIG. 18 is a schematic structural diagram of a scan drive circuit according to some embodiments of the present disclosure.

In some embodiments, FIG. 18 shows a schematic structural diagram of a scan drive circuit 01. As shown in FIG. 18, the scan drive circuit 01 is of a 22T1C structure, i.e., including 22 transistors and 1 capacitor, which are identified as transistors K1 to K22, and a capacitor C11, respectively. The coupling of the transistors and the capacitors is referred to FIG. 18, and will not be described in detail. In some embodiments, the scan drive circuit 01 is also of other structures, such as a 20T1C structure, which is not limited in the embodiments of the present disclosure.

STD refers to a reset terminal to which the scan drive circuit 01 is coupled. STU refers to an input terminal to which the scan drive circuit 01 is coupled. VDD, VDDA, VGL1, and VGL2 refer to power supply terminals to which the scan drive circuit 01 is coupled, wherein VDD and VDDA provide power supply signals with a high potential, and VGL1 and VGL2 provide power supply signals with a low potential. CLK1 and CLKD1 refer to clock terminals to which the scan drive circuit 01 is coupled. CR1 refers to the shift output terminal coupled to the scan drive circuit 01 to cascade another stage of the scan drive circuit 01. OUT11 refers to a drive output terminal coupled to the scan drive circuit 01 to be coupled to a pixel via a gate line G1. QBA and QBB refer to two pull-down nodes in the scan drive circuit 01, respectively, and Q1 refers to a pull-up node in the scan drive circuit 01. The pull-down nodes QBA and QBB are operated alternately to avoid negative drift due to the transistors being in a negative state for a long time.

Moreover, in the embodiments of the present disclosure, the scan drive circuits 01 only corresponding to the odd-numbered row of pixels include a cascade transistor (i.e., the transistor M17) as shown in FIG. 18, and the scan drive circuits 01 corresponding to the even-numbered row of pixels are not provided with the cascade transistor. The two scan drive circuits 01 corresponding to two adjacent rows of pixels share the pull-down nodes QBA and QBB, and the potentials of the pull-up nodes Q1 in two scan drive circuits 01 corresponding to two adjacent rows of pixels change synchronously (i.e., the nodes are charged and discharged at the same time, with the potentials changing synchronously). Accordingly, it can be seen that two scan drive circuits 01 corresponding to two adjacent rows of pixels are of a 41T2C structure.

Figure 19:
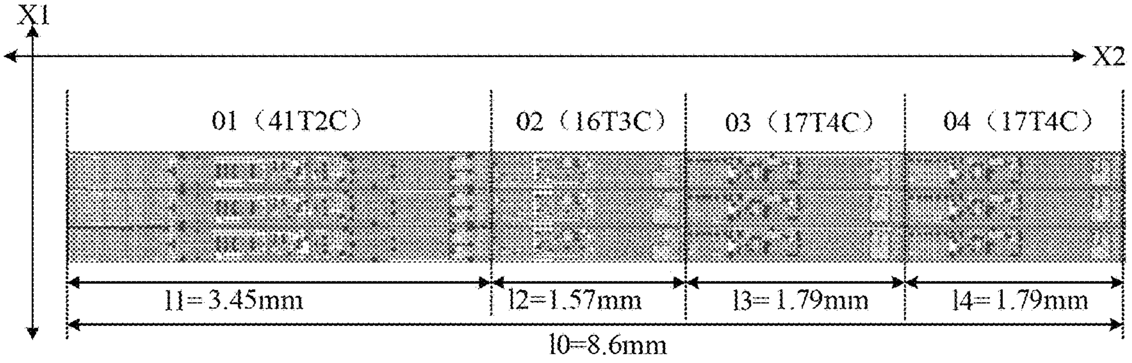
FIG. 19 is a layout diagram of a pixel drive circuit based on the structure shown in FIGS. 11 to 13.
Figure 20:
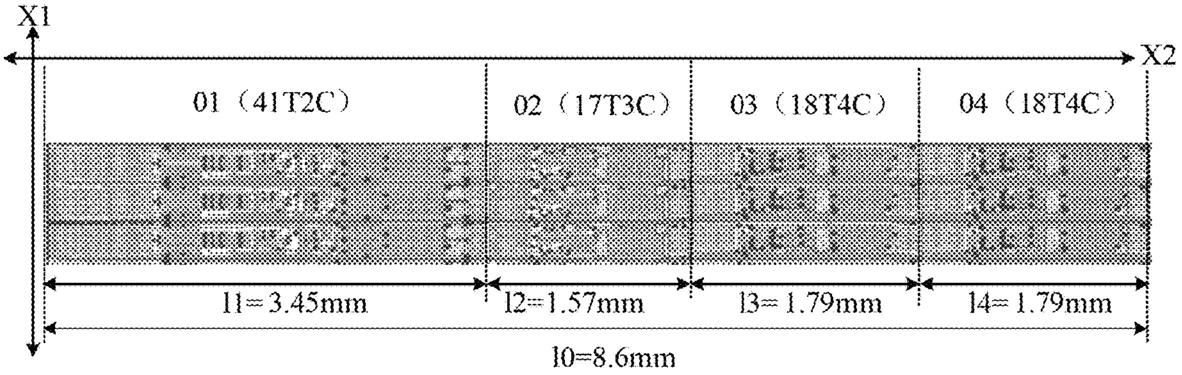
FIG. 20 is a layout diagram of a pixel drive circuit based on the structure shown in FIGS. 14 to 16.

In some embodiments, taking as an example that each of the emission drive circuits 02 is coupled to two adjacent rows of pixels P1, each of the compensation drive circuits 03 is coupled to two adjacent rows of pixels P1, and each of the reset drive circuits 04 is coupled to two adjacent rows of pixels P1, it can be seen from the structures shown in FIGS. 19 and 20, for each two adjacent rows of pixels P1, in the pixel column direction X1, the total width of two scan drive circuits 01 coupled to two rows of pixels P1 in one-to-one correspondence is equal to the width of one emission drive circuit 02 coupled to two rows of pixels P1, is equal to the width of one compensation drive circuits 03 coupled to two rows of pixels P1, and is equal to the width of one reset drive circuit 04 coupled to two rows of pixels P1. Thus, the structural layout is facilitated, and the layout space is fully utilized. In addition, in the pixel row direction X2, the length 11 of the scan drive circuit 01 is greater than the length 12 of the emission drive circuit 02, is greater than the length 13 of the compensation drive circuit 03, and is greater than the length 14 of the reset drive circuit 04. As the compensation drive circuit 03 and the reset drive circuit 04 are of the same structure, the length 13 of the compensation drive circuit 03 is equal to the length 14 of the reset drive circuit 04 and is greater than the length 12 of the emission drive circuit 02.

Exemplarily, in the pixel drive circuit shown in FIGS. 19 and 20, the length 11 of the scan drive circuit 01 is 3.45 millimeters (mm). The length 12 of the emission drive circuit 02 is 1.57 mm. The length 13 of the compensation drive circuit 03 and the length 14 of the reset drive circuit 04 are both 1.79 mm. Furthermore, the total length 10 of the pixel drive circuit is 8.6 mm. FIG. 19 differs from FIG. 20 in that: FIG. 19 shows a pixel drive circuit exemplified by the Split1 structure corresponding to FIG. 11, in which two scan drive circuits 01 corresponding to two adjacent rows of pixels are of 41T2C, an emission drive circuit 02 shared by two adjacent rows of pixels is of 16T3C, and a compensation drive circuit 03 and a reset drive circuit 04 shared by two adjacent rows of pixels are of 17T4C; and FIG. 20 shows a pixel drive circuit exemplified by the Split2 structure corresponding to FIG. 14, in which two scan drive circuits 01 corresponding to two adjacent rows of pixels are of 41T2C, an emission drive circuit 02 shared by two adjacent rows of pixels is of 17T3C, and a compensation drive circuit 03 and a reset drive circuit 04 shared by two adjacent rows of pixels are of 18T4C. However, the different structures shown in FIGS. 19 and 20 are of the same length.

In some embodiments of the present disclosure, the material of each transistor included in the pixel drive circuit 00 includes an oxide material. That is, the transistor is an oxide transistor.

Figure 21:
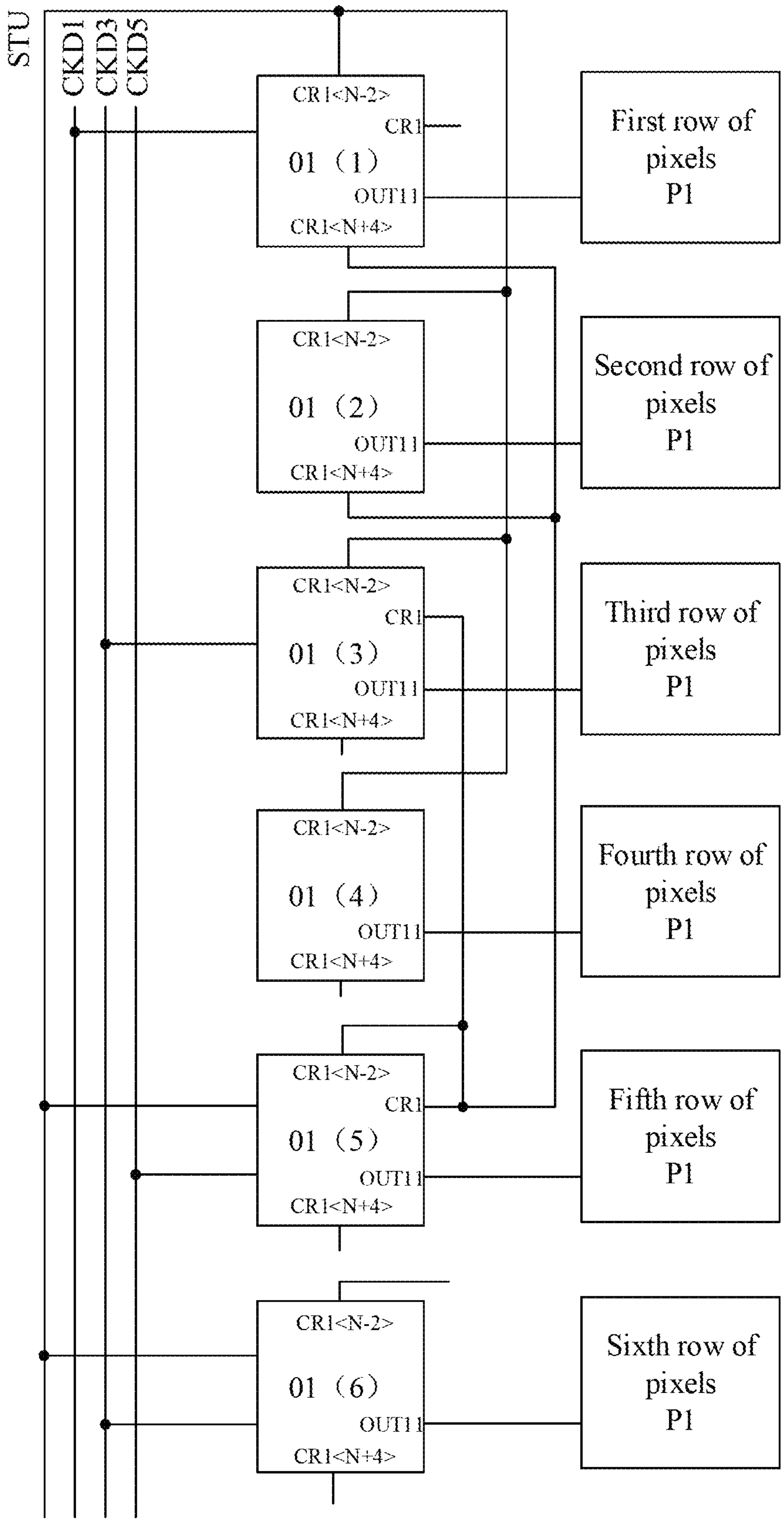
FIG. 21 is a schematic diagram of the cascaded arrangement of a plurality of scan drive circuits according to some embodiments of the present disclosure.

In some embodiments, referring to FIG. 21, in the plurality of cascaded scan drive circuits 01, the input terminal STU of the $N^{th}$ scan drive circuit 01 is coupled to the output terminal (which is referred to as the cascade output terminal CR1) of the $(N-2)^{th}$ scan drive circuit 01, the reset terminal STD of the $N^{th}$ scan drive circuit 01 is coupled to the output terminal of the $(N+4)^{th}$ scan drive circuit 01, and the scan drive circuit 01 coupled to the odd-numbered row of pixels and the scan drive circuit 01 coupled to the even-numbered row of pixels share the input terminal STU and the reset terminal STD, where N is an integer of 3 or more, and N is less than the number of the plurality of scan drive circuits 01. On this basis, referring to FIG. 18, six clock terminals CLK1 for output are included, and three clock terminals CLKD for cascade are included. In the case that CR1 represents the cascade signal, STU<N>=CR<N−2>, STD<N>=CR<N+4>, and the input terminal STU and the reset terminal of odd-numbered and even-numbered rows are shared by STD. FIG. 21 schematically shows six scan drive circuits 01(1) to 01(6) coupled to the adjacent first row of pixels P1 to the sixth row of pixels P1. Also, only three clock terminals CKD1, CKD3, and CKD5 are schematically shown coupled in cascade.

Figure 22:
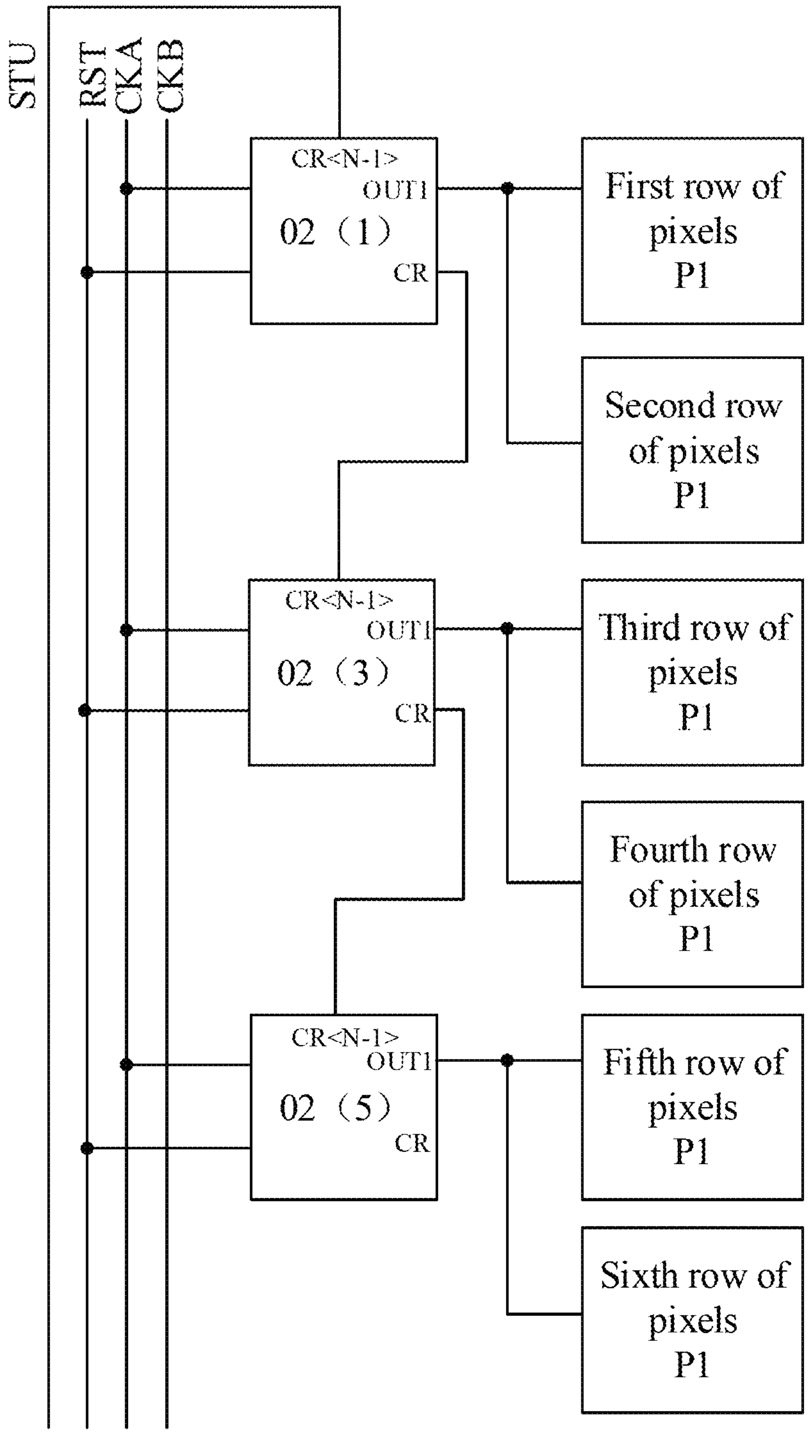
FIG. 22 is a schematic diagram of the cascaded arrangement of a plurality of emission drive circuits according to some embodiments of the present disclosure.
Figure 23:
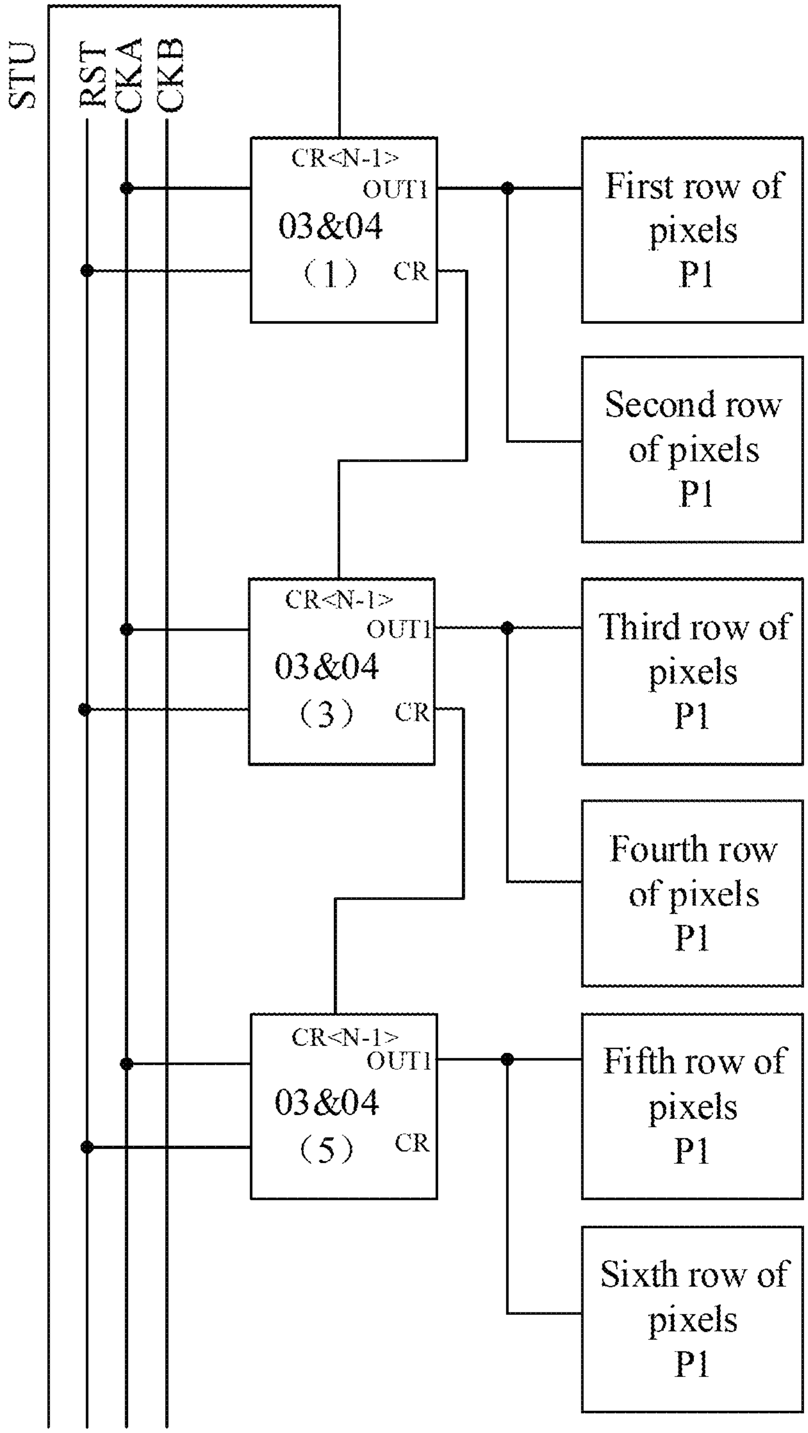
FIG. 23 is a schematic diagram of the cascaded arrangement of a plurality of compensation drive circuits and a plurality of reset drive circuits according to some embodiments of the present disclosure.

In some embodiments, as can be seen from FIGS. 22 and 23, in the plurality of cascaded emission drive circuits 02, the plurality of cascaded compensation drive circuits 03, and the plurality of cascaded reset drive circuits 04, the output terminal of the previous drive circuit is coupled to the input terminal of the adjacent next-stage drive circuit, and the reset terminal of the previous drive circuit is coupled to the output terminal of the adjacent next-stage drive circuit.

It should be noted that FIGS. 22 and 23 are both schematic cascade diagrams illustrating the structures shown in FIGS. 15 and 16, that is, the structures include the shift output terminal CR and the drive output terminal OUT1, and in which the drive circuits drive the pixels in a one-to-two manner. As can be further seen from FIGS. 22 and 23, the shift output terminal CR is defined to be coupled to another stage of cascaded drive circuit, and the drive output terminal OUT1 is defined to be coupled to the pixels. And every two adjacent rows of pixels share one drive circuit. FIGS. 22 and 23 each schematically show only three drive circuits, and the drive circuits coupling the first row of pixels P1 and the second row of pixels are identified as 02(1) and 03&04(1), the drive circuits coupling the third row of pixels P1 and the fourth row of pixels are identified as 02(3) and 03&04(3), and the drive circuits coupling the fifth row of pixels P1 and the sixth row of pixels are identified as 02(5) and 03&04(5). The coupling to the first clock terminal CKA and the second clock terminal CKB is also schematically shown, wherein the emission drive circuit 02, the compensation drive circuit 03 and the reset drive circuit 04 all adopt only two clock terminals.

Figure 24:
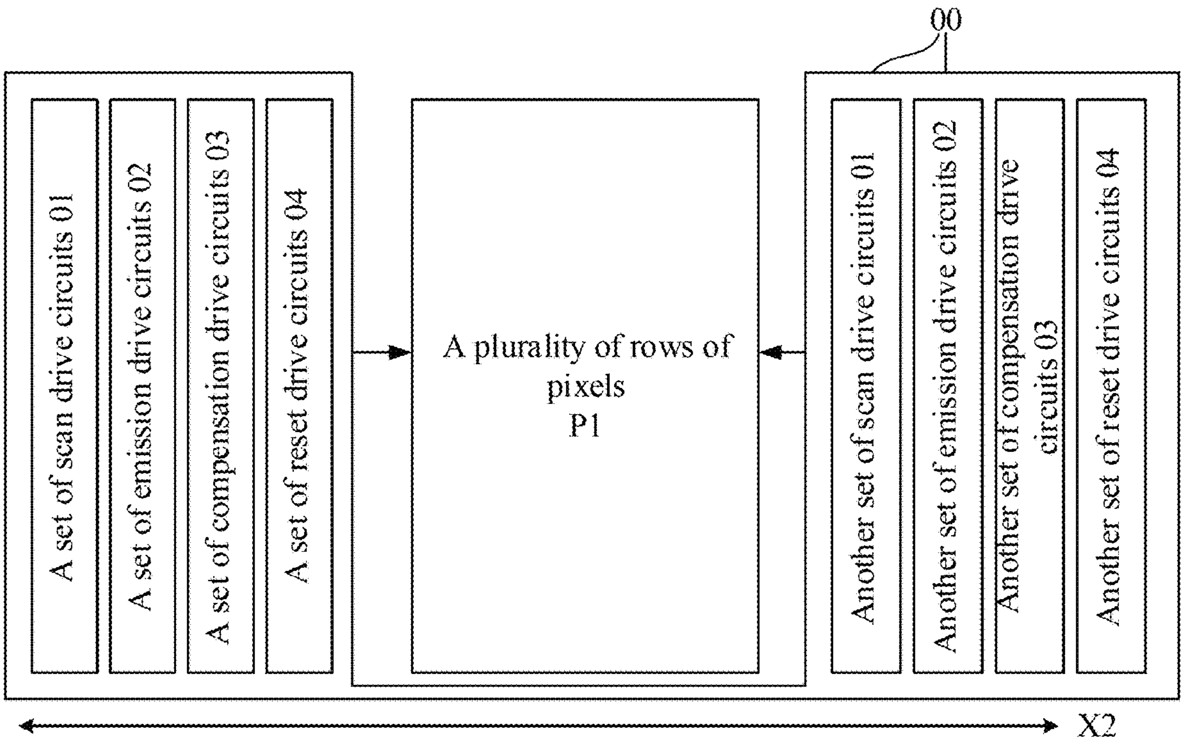
FIG. 24 is a schematic structural diagram of the pixel drive circuit with dual-sided drive according to some embodiments of the present disclosure.

In some embodiments, FIG. 24 is a schematic structural diagram of yet still another pixel drive circuit according to some embodiments of the present disclosure. As shown in FIG. 24, the pixel drive circuit 00 according to some embodiments of the present disclosure includes:

in the pixel row direction X2, two sets of scan drive circuits 01 respectively located on both sides of the pixels, each set of scan drive circuits 01 including a plurality of cascaded scan drive circuits 01; in the pixel row direction X2, two sets of emission drive circuits 02 respectively located on both sides of the pixels, each set of emission drive circuit 02 including a plurality of cascaded emission drive circuits 02; in the pixel row direction X2, two sets of compensation drive circuits 03 respectively located on both sides of the pixels, each set of compensation drive circuits 03 including a plurality of cascaded compensation drive circuits 03; and in the pixel row direction X2, two sets of reset drive circuits 04 respectively located on two sides of the pixels, each set of reset drive circuits 04 including a plurality of cascaded reset drive circuits 04. That is, dual-sided drive is adopted for a plurality of rows of pixels P1.

In summary, the embodiments of the present disclosure provide a pixel drive circuit. The pixel drive circuit includes a plurality of scan drive circuits, a plurality of emission drive circuits, a plurality of compensation drive circuits, and a plurality of reset drive circuits all cascaded in the pixel column direction. The scan drive circuits are configured to transmit gate drive signals to the pixels via gate lines, the emission drive circuits are configured to transmit emission control signals to the pixels via emission control lines, the compensation drive circuits are configured to transmit compensation signals to the pixels via compensation lines, and the reset drive circuits are configured to transmit reset signals to the pixels via reset lines to drive the pixels to emit light. In addition, the scan drive circuit, the emission drive circuit, the compensation drive circuit, and the reset drive circuit corresponding to the same row of pixels are arranged sequentially along the pixel row direction, the scan drive circuit being disposed farthest away from the pixels. Moreover, among the signal lines coupled to the pixel drive circuit, a plurality of signal lines is overlapped with each other, and cutouts are provided at the overlapping portions of the plurality of signal lines. Thus, it can not only reduce the impact of signal interference on the scan drive circuit but can also reduce the overlapping area between signal lines and decrease the capacitance on the signal lines. As a result, it effectively lowers the interference with the signals transmitted to the pixels, ensuring reliable driving of pixel emission.

Figure 25:
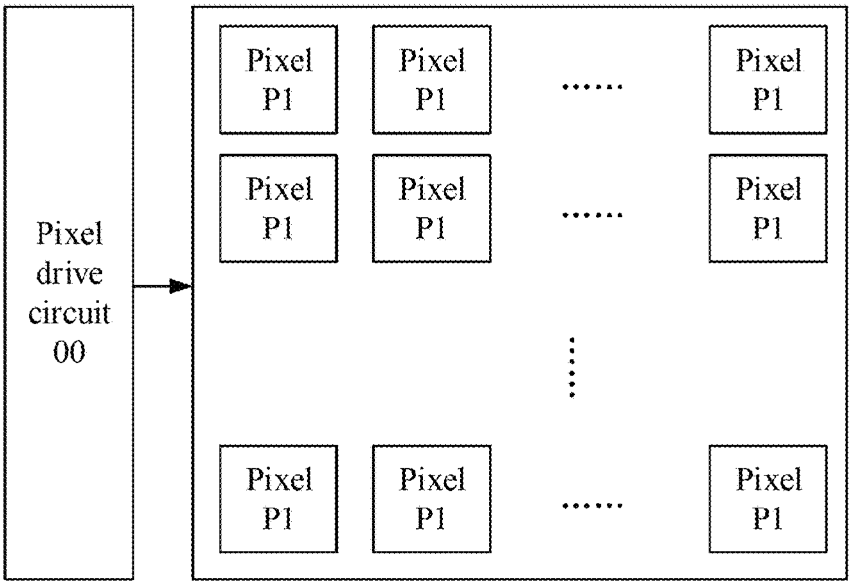
FIG. 25 is a schematic structural diagram of a display apparatus according to some embodiments of the present disclosure.

FIG. 25 is a schematic structural diagram of a display apparatus according to some embodiments of the present disclosure. As shown in FIG. 25, the display apparatus includes a plurality of pixels P1, and the pixel drive circuit 00 described in the above embodiment.

In the figure, the pixel drive circuit 00 is coupled to the plurality of pixels P1, and is configured to drive the emission of the plurality of pixels P1. The one-to-one coupling of the pixel drive circuit 00 to the pixels P1 is not shown in FIG. 25.

Figure 26:
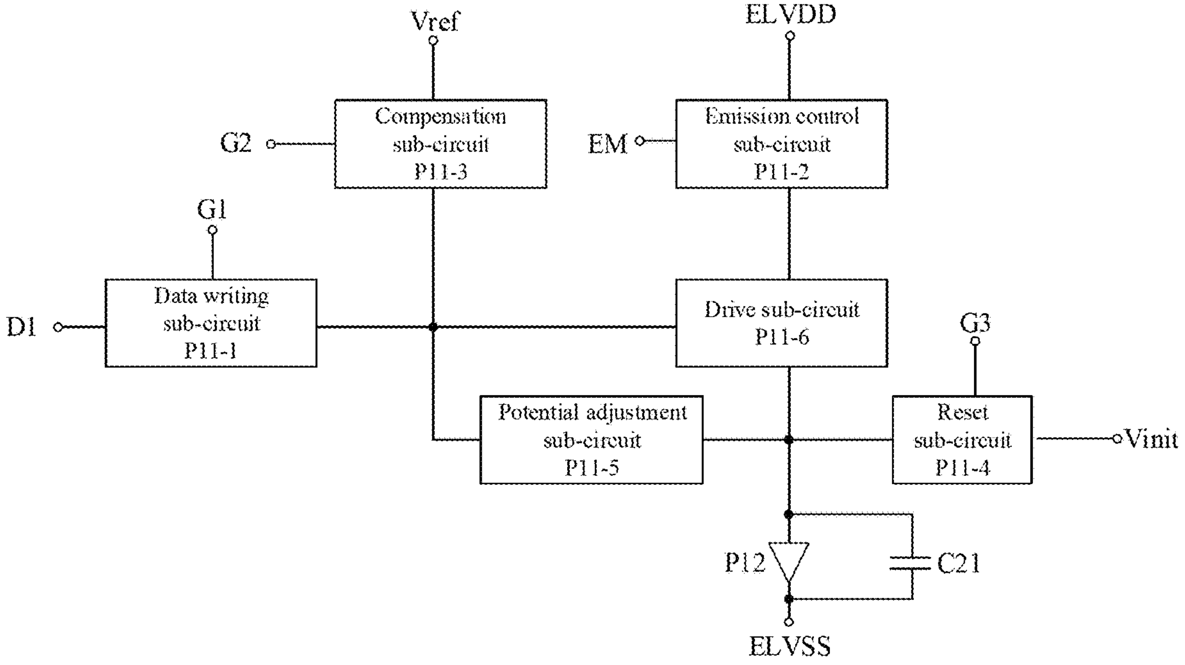
FIG. 26 is a schematic structural diagram of a pixel circuit according to some embodiments of the present disclosure.

FIG. 26 is a schematic structural diagram of pixels P1 according to some embodiments of the present disclosure. As shown in FIG. 26, each pixel P1 includes a pixel circuit P11 and a emission element P12. In addition, the pixel circuit P11 includes a data writing sub-circuit P11-1, a emission control sub-circuit P11-2, a compensation sub-circuit P11-3, a reset sub-circuit P11-4, a potential adjustment sub-circuit P11-5, and a drive sub-circuit P11-6.

The data writing sub-circuit P11-1 is coupled to the gate line G1, the data line D1 and the control terminal of the drive sub-circuit P11-6, respectively, and is configured to control the connection and disconnection between the data line D1 and the control terminal of the drive sub-circuit P11-6 based on a gate drive signal provided by the gate line G1.

For example, the data writing sub-circuit P11-1 controls the conduction between the data line D1 and the control terminal of the drive sub-circuit P11-6 in the case that the potential of the gate drive signal provided by the gate line G1 is the first potential, such that the data line D1 transmits the data signal to the control terminal of the drive sub-circuit P11-6. Moreover, the data writing sub-circuit P11-1 controls the data line D1 to be decoupled from the control terminal of the drive sub-circuit P11-6 in the case that the potential of the gate drive signal provided by the gate line G1 is the second potential.

The emission control sub-circuit P11-2 is coupled to the input terminals of the emission control line EM, the charging power supply line ELVDD and the drive sub-circuit P11-6, respectively, and is configured to control the connection and disconnection between the charging power supply line ELVDD and the input terminal of the drive sub-circuit P11-6 based on a emission control signal provided by the emission control line EM.

For example, the emission control sub-circuit P11-2 controls the conduction between the charging power supply line ELVDD and the input terminal of the drive sub-circuit P11-6 in the case that the potential of the emission control signal provided by the emission control line EM is the first potential, such that the charging power supply line ELVDD transmits a charging power supply signal to the input terminal of the drive sub-circuit P11-6. Moreover, the emission control sub-circuit P11-2 controls the charging power supply line ELVDD to be decoupled from the input terminal of the drive sub-circuit P11-6 in the case that the potential of the emission control signal provided by the emission control line EM is the second potential. In some embodiments, the potential of the charging power supply signal is the first potential.

The compensation sub-circuit P11-3 is coupled to the compensation line G2, the reference signal line Vref, and the control terminal of the drive sub-circuit P11-6, respectively, and is configured to control the connection and disconnection between the reference signal line Vref and the control terminal of the drive sub-circuit P11-6 based on the compensation signal provided by the compensation line G2.

For example, the compensation sub-circuit P11-3 controls the conduction between the reference signal line Vref and the control terminal of the drive sub-circuit P11-6 in the case that the potential of the compensation signal provided by the compensation line G2 is the first potential, such that the reference signal line Vref transmits a reference power supply signal to the control terminal of the drive sub-circuit P11-6. Moreover, the compensation sub-circuit P11-3 controls the reference signal line Vref to be decoupled from the control terminal of the drive sub-circuit P11-6 in the case that the potential of the compensation signal provided by the compensation line G2 is the second potential.

The reset sub-circuit P11-4 is coupled to the reset line G3, the initial power supply line Vinit, and the output terminal of the drive sub-circuit P11-6, respectively, and is configured to control the connection and disconnection between the initial power supply line Vinit and the output terminal of the drive sub-circuit P11-6 based on a reset signal provided by the reset line G3.

For example, the reset sub-circuit P11-4 controls the conduction between the initial power supply line Vinit and the output terminal of the drive sub-circuit P11-6 in the case that the potential of the reset signal provided by the reset line G3 is the first potential, such that the initial power supply line Vinit transmits an initial power supply signal to the output terminal of the drive sub-circuit P11-6. Moreover, the reset sub-circuit P11-4 controls the initial power supply line Vinit to be decoupled from the output terminal of the drive sub-circuit P11-6 in the case that the potential of the reset signal provided by the reset line G3 is the second potential.

The potential adjustment sub-circuit P11-5 is coupled to the control terminal and the output terminal of the drive sub-circuit P11-6, respectively, and is configured to adjust the potential of the output terminal of the drive sub-circuit P11-6 based on the potential of the control terminal of the drive sub-circuit P11-6.

The output terminal of the drive sub-circuit P11-6 is also coupled to the first electrode of the emission element P12 and is configured to transmit an emission drive signal (e.g., a driving current) to the first electrode of the emission element P12 based on the potential of the input terminal and the potential of the control terminal. The second electrode of the emission element P12 is also coupled to the pull-down power supply line ELVSS, and is configured to emit light based on the emission drive signal and the pull-down power supply signal provided by the pull-down power supply line ELVSS. In some embodiments, the potential of the pull-down power supply signal is low. The first electrode of the emission element P12 is an anode, and the second electrode of the emission element P12 is a cathode.

Figure 27:
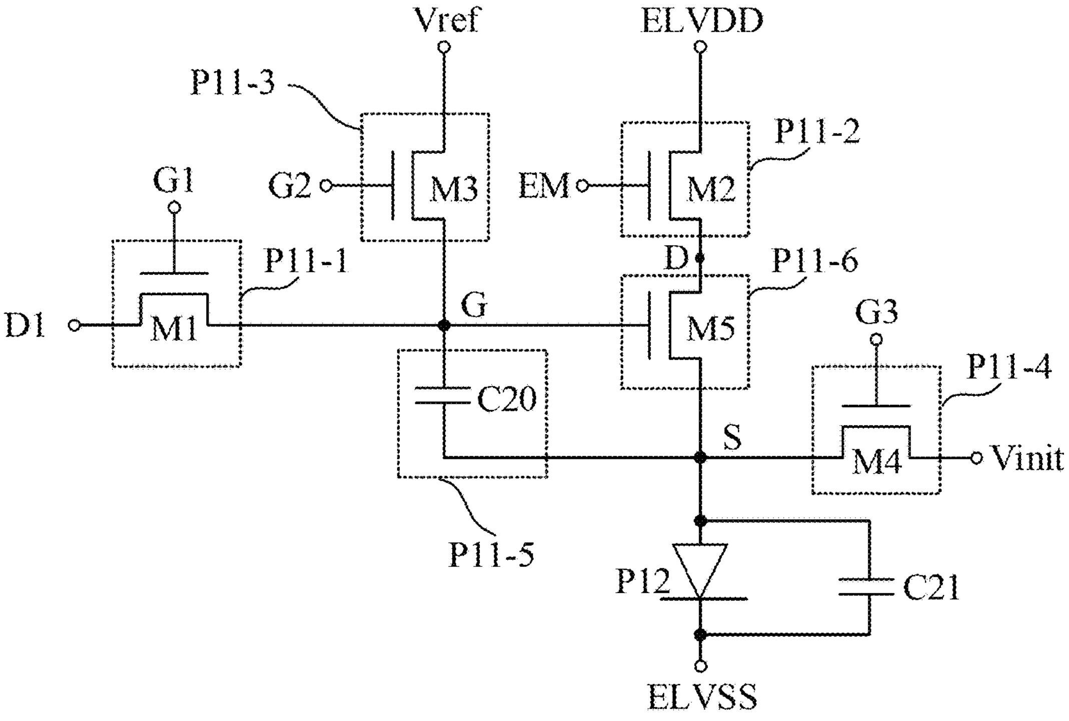
FIG. 27 is a schematic diagram of a pixel circuit based on the structure shown in FIG. 26.

FIG. 27 is a schematic circuit diagram of pixels based on the structure shown in FIG. 26. As shown in FIG. 27, the data writing sub-circuit P11-1 includes a transistor M1; the emission control sub-circuit P11-2 includes a transistor M2; the compensation sub-circuit P11-3 includes a transistor M3; the reset sub-circuit P11-4 includes a transistor M4; the potential adjustment sub-circuit P11-5 includes a capacitor C20; the drive sub-circuit P11-6 includes a transistor M5. That is, the pixel circuit P11 is of a 5T1C structure including five transistors and one capacitor.

The gate of the transistor M1 is coupled to the gate line G1, the first electrode of the transistor M1 is coupled to the data line D1, and the second electrode of the transistor M1 is coupled to the gate of the transistor M5.

The gate of the transistor M2 is coupled to the emission control line EM, the first electrode of the transistor M2 is coupled to the charging power supply terminal ELVDD, and the second electrode of the transistor M2 is coupled to the first electrode of the transistor M5.

The gate of transistor M3 is coupled to the compensation line G2, the first electrode of transistor M3 is coupled to the reference signal line Vref, and the second electrode of transistor M3 is coupled to the gate of transistor M5.

The gate of the transistor M4 is coupled to the reset line G3, the first electrode of the transistor M4 is coupled to the initial power supply line Vinit, and the second electrode of the transistor M4 is coupled to the second electrode of the transistor M5.

The second electrode of the transistor M5 is also coupled to the first electrode of the emission element P12.

One end of the capacitor C20 is coupled to the gate of the transistor M5, and the other end of the capacitor C20 is coupled to the second electrode of the transistor M5. That is, the control terminal of the drive sub-circuit P11-6 is the gate G of the transistor M5, the input terminal is the first electrode of the transistor M5, and the output terminal is the second electrode of the transistor M5. In some embodiments, the first electrode is the drain S, and the second electrode is the source D.

Moreover, a parasitic capacitor C21 formed between the first electrode and the second electrode of the emission element P12 is also schematically shown in FIGS. 26 and 27. It should be noted that FIG. 26 and FIG. 27 only schematically show one type of the pixels, and the pixels are not limited to the 5T1C structure illustrated herein and are also of a 6T2C structure.

In some embodiments, each transistor in the pixel circuit P11 is also an N-type transistor, and accordingly, the signal with the first potential provided by each signal line coupled to the pixel circuit P11 has a high potential, and the signal with the second potential provided by each signal line has a low potential. In some embodiments, each transistor in the pixel circuit P11 is also a P-type transistor, and accordingly, the signal with the first potential provided by each signal line coupled to the pixel circuit P11 has a low potential, and the signal with the second potential provided by each signal line has a high potential. Moreover, as in the pixel drive circuit 00, the material of each transistor in the pixel circuit P11 is also an oxide material.

Figure 28:
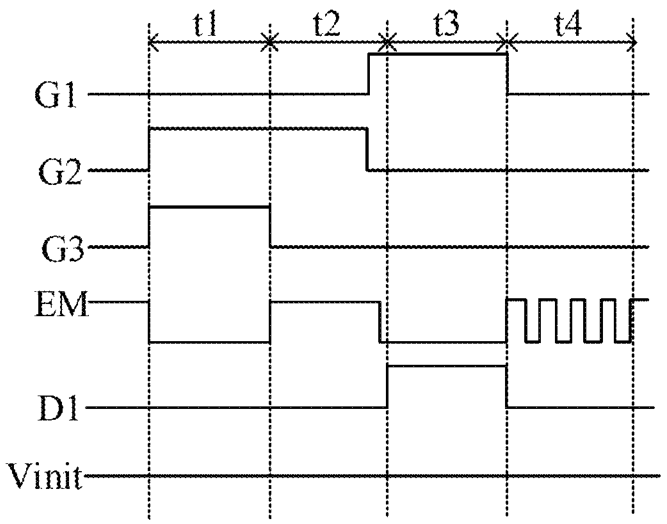
FIG. 28 is a signal sequence diagram for driving the pixels to emit light according to some embodiments of the present disclosure.

Taking the pixels shown in FIG. 27 as an example, and each transistor is an N-type transistor, FIG. 28 shows a sequence diagram for driving pixel emission. As can be seen from FIG. 28, the driving of pixel emission includes four stages, namely, a reset stage t1, a compensation stage t2, a data writing stage t3, and an emission stage t4.

In the reset stage t1, the gate line G1 provides a gate drive signal with a low potential, the emission control line EM provides an emission control signal with a low potential, the compensation line G2 provides a compensation signal with a high potential, and the reset line G3 provides a reset signal with a high potential. Therefore, the transistor M1 and the transistor M2 are both turned off, and the transistor M3 and the transistor M4 are both turned on. Accordingly, the reference signal line Vref transmits a reference signal to the gate of the transistor M5 to reset the gate (i.e., the G point) of the transistor M5. Moreover, the initial power supply line Vinit transmits an initial power supply signal to the second electrode of the transistor M5 to reset the second electrode (i.e., the S point) of the transistor M5.

In the compensation stage t2, the gate line G1 continuously provides a gate drive signal with a low potential, the emission control line EM provides an emission control signal with a high potential, the compensation line G2 continuously provides a compensation signal with a high potential, and the reset line G3 provides a reset signal with a low potential. Therefore, the transistor M1 and the transistor M4 are both turned off, and the transistor M2 and the transistor M4 are both turned on. Accordingly, the reference signal line Vref continuously transmits a reference signal to the gate of the transistor M5, and the charging power supply line ELVDD transmits a charging power supply signal to the first electrode (i.e., the D point) of the transistor M5, thereby achieving the internal compensation of the S point.

In the data writing stage t3, the gate line G1 provides a gate drive signal with a high potential, the emission control line EM provides an emission control signal with a low potential, the compensation line G2 provides a compensation signal with a low potential, and the reset line G3 continuously provides a reset signal with a low potential. Therefore, only the transistor M1 is turned on, and the transistor M2, the transistor M3, and the transistor M4 are all turned off. Accordingly, the data line D1 transmits a data signal to the gate of the transistor M5, such that the data signal is written into the G point.

In the emission stage t4, the gate line G1 provides a gate drive signal with a low potential, the emission control line EM provides an emission control signal with a high potential, the compensation line G2 continuously provides a compensation signal with a low potential, and the reset line G3 continuously provides a reset signal with a low potential. Therefore, only the transistor M2 is turned on, and the transistor M1, the transistor M3, and the transistor M4 are all turned off. In addition, the gate of the transistor M5 is the data signal charged in the previous stage t3 and has a high potential. The transistor M5 is turned on, such that a path is formed between the charging power supply line ELVDD and the pull-down power supply line ELVSS, and the emission element P12 emits light.

Figure 29:
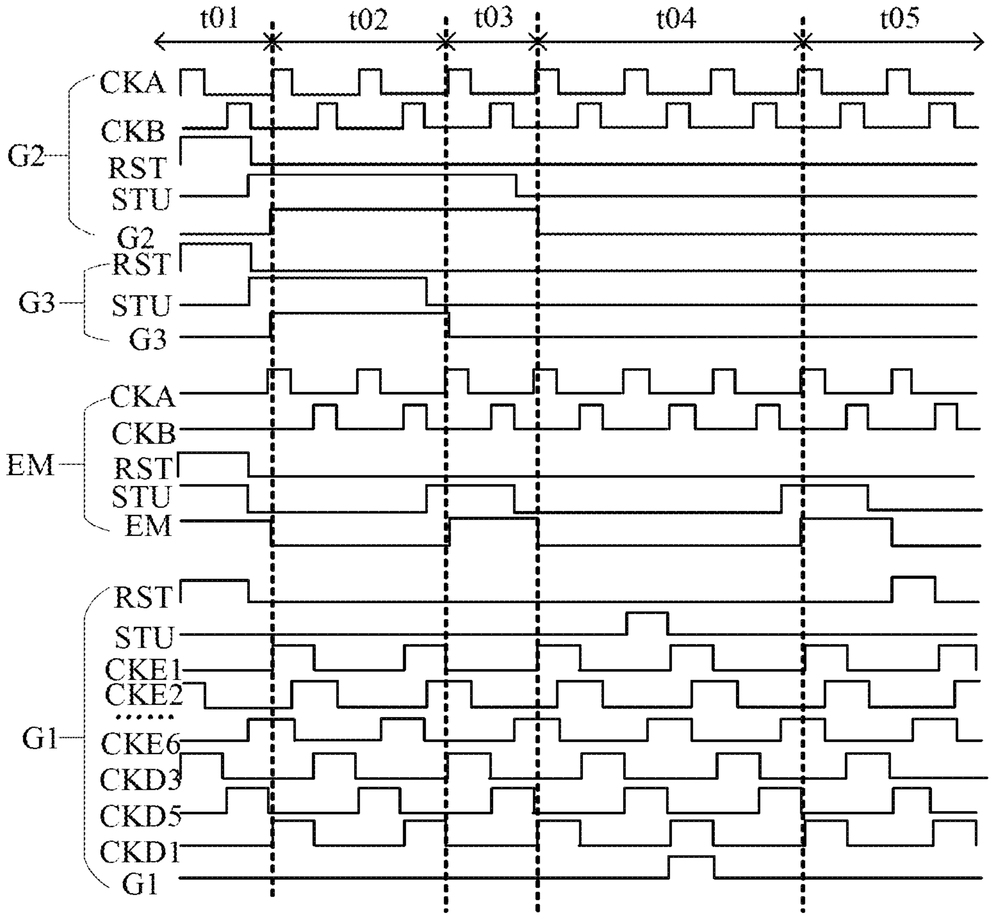
FIG. 29 is a comprehensive signal sequence diagram of the pixel drive circuit driving the pixels to emit light according to some embodiments of the present disclosure.

As can be seen from the description of the embodiments described above, it is necessary for the pixel drive circuit to provide the signals shown in FIG. 28 to the pixels P1. Thus, on the basis of the structure shown in FIG. 28, taking the respective drive circuits shown in FIGS. 15, 16, and 18 as an example, FIG. 29 shows a sequence diagram of signals to which the respective circuits in the pixel drive circuit are coupled. As can be seen from FIG. 29, the entire driving process includes the following five stages: a reset stage t01, a pixel reset stage t02, a compensation stage t03, a data writing stage t04, and an emission stage t05 of the pixel drive circuit 00. In the figure, the pixel reset stage t02, the compensation stage t03, the data writing stage t04, and the emission stage t05 are described with reference to the sequence diagram and the embodiments shown in FIG. 28. In the figure, CKE1, CKE2, . . . , CKE6 refer to six clock terminals for output that are coupled to the plurality of cascaded scan drive circuits 01, and CKD1, CKD3, and CKD5 refer to three clock terminals for cascade that are coupled to the plurality of cascaded scan drive circuits 01.

In the figure, in the reset stage t01 of the pixel drive circuit 00, the reset signals of the reset signal terminals RST coupled to the scan drive circuit 01 which provides the gate drive signal to the gate line G1, the emission drive circuit 02 which provides the emission control signal to the emission control line EM, the compensation drive circuit 03 which provides the compensation signal to the compensation line G2, and the reset drive circuit 04 which provides the reset signal to the reset line G3 are all set high. In the scan drive circuit 01, the compensation drive circuit 03, and the reset drive circuit 04, the potential of the pull-up node Q is pulled low, and the potential of the pull-down node QB is pulled high. Moreover, in the emission drive circuit 02, the pull-up node Q is pulled high, and the pull-down node QB is pulled low. Therefore, the reset of each of the drive circuits is achieved.

In the pixel reset stage t02, the potentials of the signal terminals coupled to the scan drive circuit 01, the emission drive circuit 02, the compensation drive circuit 03, and the reset drive circuit 04 satisfy the form of the stage t02 shown in FIG. 29, such that the scan drive circuit 01 provides the gate line G1 with the gate drive signal with low potential, the emission drive circuit 02 provides the emission control line EM with the emission control signal with low potential, the compensation drive circuit 03 provides the compensation line G2 with the compensation signal with high potential, and the reset drive circuit 04 provides the reset line G3 with the reset signal with high potential, thereby ensuring reliable resetting of the G point and the S point in the pixel circuit P11 based on the reset stage t1 shown in FIG. 28.

In the compensation stage t03, the potentials of the signal terminals coupled to the scan drive circuit 01, the emission drive circuit 02, the compensation drive circuit 03, and the reset drive circuit 04 satisfy the form of the stage t03 shown in FIG. 29, such that the scan drive circuit 01 provides the gate line G1 with the gate drive signal with low potential, the emission drive circuit 02 provides the emission control line EM with the emission control signal with a high potential, the compensation drive circuit 03 provides the compensation line G2 with the compensation signal with a high potential, and the reset drive circuit 04 provides the reset line G3 with the reset signal with low potential, thereby ensuring the internal compensation of the S point in the pixel circuit P11 based on the compensation stage t2 shown in FIG. 28. In the figure, the compensation line G2 is provided with a compensation signal with a high potential, such that the time for turning on the transistor M2 is equal to the sum of the durations of the reset stage t1 and the compensation stage t2. The durations for providing a compensation signal with a high potential to the compensation line G2 and providing an emission control signal with a high potential to the emission control line EM are the duration for internal compensation.

In the data writing stage t04, the potentials of the signal terminals coupled to the scan drive circuit 01, the emission drive circuit 02, the compensation drive circuit 03, and the reset drive circuit 04 satisfy the form of the stage t04 shown in FIG. 29, such that the scan drive circuit 01 provides the gate line G1 with the gate drive signal with high potential, the emission drive circuit 02 provides the emission control line EM with the emission control signal with low potential, the compensation drive circuit 03 provides the compensation line G2 with the compensation signal with low potential, and the reset drive circuit 04 provides the reset line G3 with the reset signal with low potential, thereby ensuring the writing of the data signal to the G point in the pixel circuit P11 based on the data writing stage t3 shown in FIG. 28. It should be noted that, in the one-to-two manner, the duration for providing an emission control signal with a low potential to the emission control line EM needs to be at least longer than the duration for providing a gate drive signal with a high potential to the gate line G1 coupled to two rows of pixels. In general, it is possible to provide an emission control signal with a high potential to the emission control line EM in advance such that the transistor M2 is turned on in advance, and to putt off the provision of an emission control signal with a low potential to the emission control line EM such that the transistor M2 is turned off in delay. Therefore, the situation that the data signals cannot be reliably written into the G point due to the influence of load is avoided.

In the emission stage t05, the potentials of the signal terminals coupled to the scan drive circuit 01, the emission drive circuit 02, the compensation drive circuit 03, and the reset drive circuit 04 satisfy the form of the stage t05 shown in FIG. 29, such that the scan drive circuit 01 provides the gate line G1 with the gate drive signal with low potential, the emission drive circuit 02 provides the emission control line EM with the emission control signal with high potential, the compensation drive circuit 03 continuously provides the compensation line G2 with the compensation signal with low potential, and the reset drive circuit 04 provides the reset line G3 with the reset signal with low potential, thereby ensuring reliable driving of the emission element P12 to emit light based on the emission stage t4 shown in FIG. 28. It should be noted that, as can be seen from FIG. 28, in the case that dimming is required, that is, the brightness of the emission element P12 is adjusted, it is assumed that the emission duration of one row of pixels P1 is Tem, the duty ratio of the emission control signal (for example, 25% or 100%), and the number of dimming segments in the emission stage is b (as initially set to 5), the duration for the emission control signal having a high potential satisfies: (Tem*duty)/b. Flexible dimming is achieved by setting the signals based on the above setting.

Figure 30:
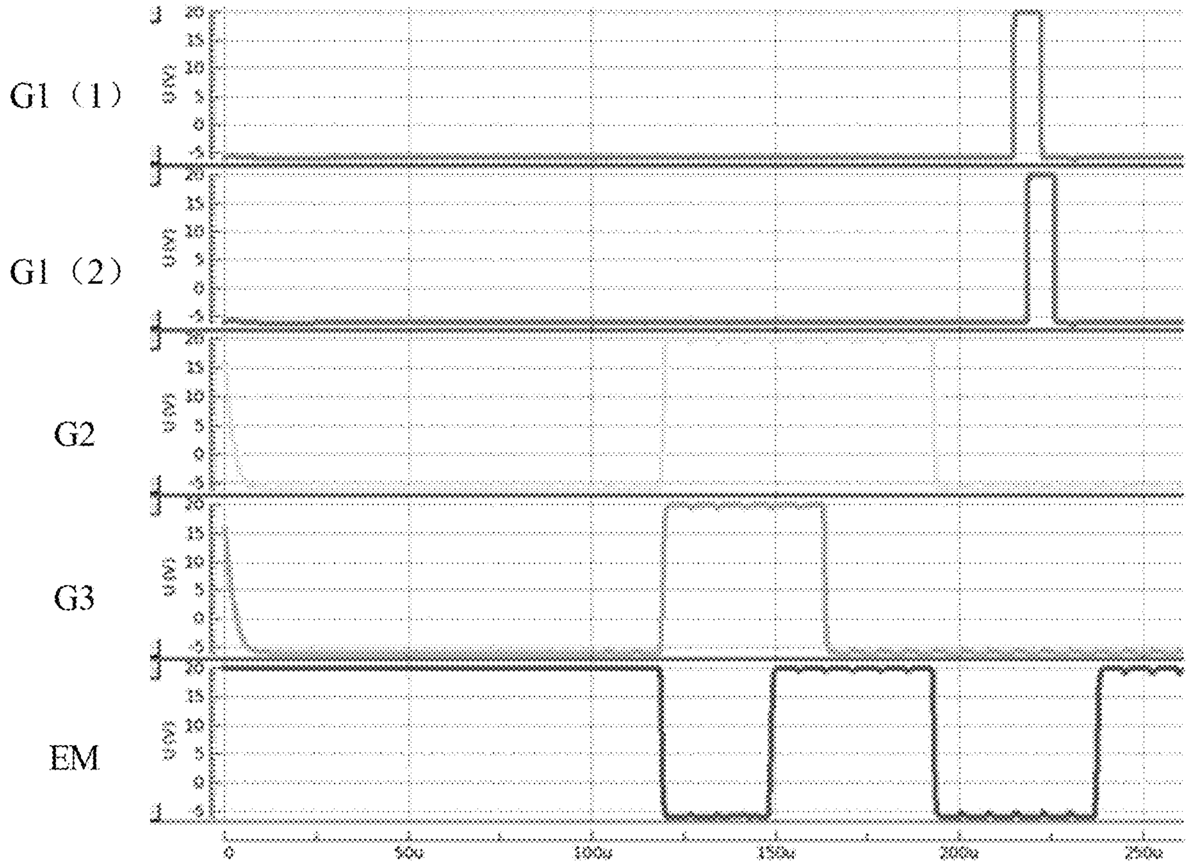
FIG. 30 is a signal simulation diagram according to some embodiments of the present disclosure.

On the basis of the structure shown in FIG. 29, FIG. 30 also schematically shows a signal simulation diagram in which a gate drive signal is provided to the gate line G1, a compensation signal is provided to the compensation line G2, a reset signal is provided to the reset line G3, and an emission control signal is provided to the emission control line EM. In the figure, the abscissa refers to duration in units of microseconds (μs); and the ordinate refers to voltage in units of volts (V). Moreover, FIG. 30 schematically shows signal sequences of the gate lines G1(1) and G1(2) to which two adjacent rows of pixels are coupled.

Referring to the above embodiments and FIG. 18, the working process of the scan drive circuit 01 is described as follows: the entire process includes four stages that are performed in sequence. In the first stage, the transistors K6 and K7 are turned on to reset the pull-up node Q1, and at this time, the potential of the pull-up node Q1 is low, and the potential of the pull-down node QB (including QBA or QBB) is high. In the second stage, the input terminal STU provides an input signal with a high potential, the transistor K1 and the transistor K2 are turned on, and the pull-up node Q1 is charged, and at this time, the potential of the pull-up node Q1 is high. In the third stage, as the potential of the pull-up node Q1 is raised in the second stage, in the case that the high potential of the clock signal provided by the clock terminal CLK1 temporarily comes, the transistor K20 is turned on by means of the bootstrap action of the capacitor C11, and the clock signal with high potential is transmitted to the output terminal OUT11 through the transistor K20. Meanwhile, the transistor K17 is also turned on, and the clock signal with a high potential provided by the clock terminal CLKD1 is also transmitted to the output terminal CR1 through the transistor K17. In the fourth stage, the potential of the clock signal provided from the clock terminal CLK1 is converted into a low potential, and the potential of the output terminal OUT11 is correspondingly pulled low. In the case that the reset terminal STD provides a reset signal with high potential, the transistors K3 and K4 are turned on to pull the potential of the pull-up node Q1 low, and at this time, the potential of the pull-down node QB is high.

Referring to the above embodiments and FIG. 15, the working process of the emission drive circuit 02 is described as follows: the entire process includes three stages that are performed in sequence. In the first stage, the reset signal terminal RST provides a reset signal with high potential, and at this time, the first clock terminal CKA provides a first clock signal with low potential, such that the transistor T08-1 is turned on, and the first power supply terminal VGH1 transmits a first power supply signal with a high potential to the pull-up node Q through the transistor T08-1, such that the potential of the pull-up node Q is pulled high. Accordingly, the transistor T12-1 is turned on, and the fourth power supply terminal VGL2 transmits a fourth power supply signal with a low potential to the pull-down node QB through the transistor T12-1, such that the potential of the pull-down node QB is pulled low. On this basis, the output transistor T02-1 and the transistor T02-1' are both turned on, and the first power supply signal is transmitted to the shift output terminal CR and the drive output terminal OUT1. In the second stage, the input terminal STU provides an input signal with low potential, the first clock terminal CKA provides a first clock signal with high potential, at this time, the transistor T01-1 and the transistor T06-1 are both turned on, the input signal with the low potential is transmitted to the pull-up node Q through the transistor T01-1 and the transistor T06-1, such that the potential of the pull-up node Q is pulled low, and thus, the output transistor T02-1 and the transistor T02-1' are both turned off, the potentials of the shift output terminal CR and the drive output terminal OUT1 are pulled low, and at this time, the potential of the pull-down node QB is pulled high. In the third stage, the input terminal STU provides an input signal with high potential, the first clock terminal CKA provides a first clock signal with high potential, at this time, the transistor T01-1 and the transistor T06-1 are both turned on, the input signal with the high potential is transmitted to the pull-up node Q through the transistor T01-1 and the transistor T06-1, such that the potential of the pull-up node Q is pulled high, and thus, the output transistor T02-1 and the transistor T02-1' are both turned on, the potentials of the shift output terminal CR and the drive output terminal OUT1 are both pulled high, and at this time, the potential of the pull-down node QB is pulled low. The working process of the emission drive circuit 02 of the structure shown in FIG. 12 is the same, and thus is not repeated herein.

Referring to the above embodiments and FIG. 16, the working process of the compensation drive circuit 03 and the reset drive circuit 04 is described as follows: the entire process includes three stages that are performed in sequence. In the first stage, the reset signal terminal RST provides a reset signal with a high potential, such that the transistor T08-2 is turned on. At this time, the first clock terminal CKA provides a first clock signal with a high potential, and the second clock terminal CKB provides a second clock signal with a low potential, such that the transistor T06-2 is turned on. The second clock terminal CKB transmits the second clock signal with the low potential to the pull-up node Q through the transistor T08-2 and the transistor T06-2, such that the potential of the pull-up node Q is pulled low. Meanwhile, the potential of the pull-down node QB is pulled high under the action of the other transistors. In the second stage, the input terminal STU provides an input signal with a low potential, the first clock terminal CKA provides a first clock signal with a high potential, at this time, the input transistor T01-2, the transistor T06-2, the transistor T02-2', and the transistor T02-2 are all turned on, the potential of the node PQ is pulled high, meanwhile, the potential of the pull-up node Q is pulled high, and the potentials of the shift output terminal CR and the drive output terminal OUT1 are both pulled high, and a signal with a high potential is output. Meanwhile, the potentials of the node PQB and the pull-down node QB are both pulled low under the action of the other transistors, and the potential of the node PQB varies with the variation of the potential of the second clock signal. In the third stage, the input terminal STU provides an input signal with a low potential, and the first clock terminal CKA provides a first clock signal with a high potential, such that the potentials of the node PQ and the pull-up node Q are both pulled low. In the case that the second clock terminal CKB provides a second clock signal with a high potential, the potential of the node PQB is pulled high, and under the action of the first clock signal with a high potential, the node PQB is bootstrapped, the transistor T05-2 is turned on, and the potential of the pull-down node QB is pulled high, such that the fifth transistor T5-2 and the seventh transistor T7-2 are turned on to pull the potentials of the shift output terminal CR and the drive output terminal OUT1 low. The working processes of the compensation drive circuit 03 and the reset drive circuit 04 of the structure shown in FIG. 13 are the same, and thus are not repeated herein.

It should be noted that the above-mentioned pulling low or pulling high means pulling the potential high or low. In addition, the above is only a brief description of the working process, and the specific control logic can be understood in combination with the circuit structure, which is not described in further detail in the embodiments of the present disclosure.

In some embodiments, the display apparatus described in the embodiments of the present disclosure is an organic light-emitting diode (OLED) display apparatus, electronic paper, a mobile phone, a tablet computer, a television, a display, a notebook computer, a navigator, or any other products or parts with a display function.

It should be understood that the terms used in detailed description of the present disclosure are defined to merely explain the embodiments of the present disclosure and are not intended to limit of the present disclosure. Unless otherwise defined, technical or scientific terms used in detailed description of the present disclosure should have the ordinary meanings as understood by those of ordinary skill in the art to which the present disclosure belongs.

For example, the word "first", "second", "third" or the like, which is used in the specification and claims of the present disclosure, is not intended to indicate any order, quantity or importance, but is merely defined to distinguish different components.

Likewise, "a", "an" or other similar words does not indicate a limitation of quantity, but rather the presence of at least one.

"Include", "comprise" or other similar words means that the elements or objects stated before "include" or "comprise" encompass the elements or objects and equivalents thereof listed after "include" or "comprise", but do not exclude other elements or objects.

"Up", "down", "left", "right" or the like is only defined to indicate relative position relationship. In a case that the absolute position of the described object is changed, the relative position relationship may be changed accordingly. "Connected" or "coupled" refers to an electrical connection.

The term "and/or" indicates that three relationships may be present. For example, A and/or B may indicate that: only A is present, both A and B are present, and only B is present. The symbol "/" usually indicates an "or" relationship between the associated objects.

The described above are merely optional embodiments of the present disclosure and are not intended to limit the present disclosure. Any modifications, equivalents, improvements, and the like, made within the spirit and principle of the present disclosure, should be included in the protection scope of the present disclosure.

What is claimed is:

1. A pixel drive circuit, comprising:

a plurality of scan drive circuits cascaded in a pixel column direction, wherein the plurality of scan drive circuits are coupled to a plurality of rows of pixels via a plurality of gate lines; and each of the scan drive circuits is further coupled to a scan drive line and is configured to transmit a gate drive signal to a gate line coupled to the scan drive circuit based on a drive signal provided by the scan drive line;

a plurality of emission drive circuits cascaded in the pixel column direction, wherein the plurality of emission drive circuits are coupled to the plurality of rows of pixels via a plurality of emission control lines; and each of the emission drive circuits is further coupled to an emission drive line and is configured to transmit an emission control signal to an emission control line coupled to the emission drive circuit based on a drive signal provided by the emission drive line;

a plurality of compensation drive circuits cascaded in the pixel column direction, wherein the plurality of compensation drive circuits are coupled to the plurality of rows of pixels via a plurality of compensation lines; and each of the compensation drive circuits is further coupled to a compensation drive line and is configured to transmit a compensation signal to a compensation line coupled to the compensation drive circuit based on a drive signal provided by the compensation drive line; and a plurality of reset drive circuits cascaded in the pixel column direction, wherein the plurality of reset drive circuits are coupled to the plurality of rows of pixels via a plurality of reset lines; and each of the reset drive circuits is further coupled to a reset drive line and is configured to transmit a reset signal to a reset line coupled to the reset drive circuit based on a drive signal provided by the reset drive line;

wherein a scan drive circuit, a emission drive circuit, a compensation drive circuit, and a reset drive circuit that are coupled to a same row of pixels are arranged sequentially in a pixel row direction, and the scan drive circuit is disposed on a side distal to the pixels; and among signal lines as coupled in the pixel drive circuit, a plurality of the signal lines is overlapped with each other, and cutouts are provided at overlapping portions of the plurality of signal lines.

2. The pixel drive circuit according to claim 1, wherein along the pixel row direction, the scan drive circuit, the emission drive circuit, the compensation drive circuit, and the reset drive circuit that are coupled to the same row of pixels are arranged sequentially in a direction proximal to the pixels.

3. The pixel drive circuit according to claim 1, wherein each of the scan drive line, the emission drive line, the compensation drive line, and the reset drive line comprises: a direct current (DC) drive line for providing a direct current signal and an alternating current (AC) drive line for providing an alternating current signal; and for the scan drive circuit, the emission drive circuit, the compensation drive circuit, and the reset drive circuit, the DC drive line coupled to each drive circuit is disposed on both sides of the drive circuit in the pixel row direction, and the AC drive line coupled to each drive circuit is disposed on one side distal to the drive circuit of the DC drive line.

4. The pixel drive circuit according to claim 3, wherein the pixel drive circuit and the pixels are both disposed on a same side of a substrate; and each of the drive lines comprises: a plurality of metal layers sequentially stacked along a direction away from the substrate, and an insulating layer further disposed between every two adjacent metal layers, every two adjacent metal layers being interconnected through a via hole penetrating through the insulating layer.

5. The pixel drive circuit according to claim 4, wherein each of the drive lines comprises: two metal layers sequentially stacked along the direction away from the substrate.

6. The pixel drive circuit according to claim 5, wherein the pixel comprises a gate (GATE) metal layer, an inter-layer di-electric (ILD) layer, and a source-drain (SD) metal layer sequentially stacked along a direction away from the substrate; and for the two metal layers, one metal layer is disposed on a same layer as the GATE metal layer, and the other metal layer is disposed on a same layer as the SD metal layer; and the insulating layer between the two metal layers is disposed on a same layer as the ILD layer.

7. The pixel drive circuit according to claim 6, wherein the cutout is provided on the GATE metal layer.

8. The pixel drive circuit according to claim 1, wherein the plurality of scan drive circuits are coupled to the plurality of rows of pixels in one-to-one correspondence;

the plurality of emission drive circuits are coupled to the plurality of rows of pixels in one-to-one correspondence, or each of the emission drive circuits is coupled to at least two rows of pixels;

the plurality of compensation drive circuits are coupled to the plurality of rows of pixels in one-to-one correspondence, or each of the compensation drive circuits is coupled to at least two rows of pixels; and the plurality of reset drive circuits are coupled to the plurality of rows of pixels in one-to-one correspondence, or each of the reset drive circuits is coupled to at least two rows of pixels.

9. The pixel drive circuit according to claim 8, wherein each of the emission drive circuits is coupled to two adjacent rows of pixels or four adjacent rows of pixels;

each of the compensation drive circuits is coupled to two adjacent rows of pixels or four adjacent rows of pixels; and each of the reset drive circuits is coupled to two adjacent rows of pixels or four adjacent rows of pixels.

10. The pixel drive circuit according to claim 9, wherein each of the emission drive circuits is coupled to two adjacent rows of pixels, each of the compensation drive circuits is coupled to two adjacent rows of pixels, and each of the reset drive circuits is coupled to two adjacent rows of pixels;

for every two adjacent rows of pixels, in the pixel column direction, a total width of two scan drive circuits coupled to the two rows of pixels in one-to-one correspondence is equal to a width of one emission drive circuit coupled to the two rows of pixels, is equal to a width of one compensation drive circuit coupled to the two rows of pixels, and is equal to a width of one reset drive circuit coupled to the two rows of pixels; and in the pixel row direction, a length of the scan drive circuit is greater than a length of the emission drive circuit, greater than a length of the compensation drive circuit, and greater than a length of the reset drive circuit; the length of the compensation drive circuit is equal to the length of the reset drive circuit and greater than the length of the emission drive circuit; and the compensation drive circuit has a same structure as the reset drive circuit.

11. The pixel drive circuit according to claim 1, wherein each of the emission drive circuit, the compensation drive circuit, and the reset drive circuit comprises: an input sub-circuit, an output sub-circuit, a pull-down control sub-circuit, and an anti-creeping pull-down sub-circuit; and wherein the input sub-circuit is respectively coupled to a first clock terminal, an input terminal, and a pull-up node, and is configured to control a potential of the pull-up node based on a first clock signal provided by the first clock terminal and an input signal provided by the input terminal;

the output sub-circuit is respectively coupled to the pull-up node, a first power supply terminal, and an output terminal, and is configured to control a potential of the output terminal based on the potential of the pull-up node and a first power supply signal provided by the first power supply terminal;

the pull-down control sub-circuit is respectively coupled to the first power supply terminal, the first clock terminal, a second clock terminal, and a pull-down node, and is configured to control a potential of the pull-down node based on the first power supply signal, the first clock signal, and a second clock signal provided by the second clock terminal; and the anti-creeping pull-down sub-circuit is respectively coupled to the pull-down node, a second power supply terminal, a third power supply terminal, and the output terminal, and is configured to control the potential of the output terminal based on the potential of the pull-down node, a second power supply signal provided by the second power supply terminal, and a third power supply signal provided by the third power supply terminal.

12. The pixel drive circuit according to claim 11, wherein for the emission drive circuit, the compensation drive circuit, and the reset drive circuit, the output terminal of each of the drive circuits is respectively coupled to the pixels and another stage of said cascaded drive circuit; and the anti-creeping pull-down sub-circuit is configured to control the potential of the output terminal based on, the potential of the pull-down node, the second power supply signal, and the third power supply signal.

13. The pixel drive circuit according to claim 12, wherein the anti-creeping pull-down sub-circuit comprises: a first transistor, a second transistor, a third transistor, and a first capacitor; and wherein gates of the first transistor (T1) and the second transistor are both coupled to the pull-down node, a first electrode of the first transistor is coupled to the second power supply terminal, a second electrode of the first transistor is coupled to a first electrode of the second transistor, and a second electrode of the second transistor is coupled to the output terminal;

a gate of the third transistor is coupled to the output terminal, a first electrode of the third transistor is coupled to the third power supply terminal, and a second electrode of the third transistor is coupled to the second electrode of the first transistor; and one end of the first capacitor is coupled to the pull-down node, and another end of the first capacitor is coupled to the second power supply terminal.

14. The pixel drive circuit according to claim 11, wherein for the emission drive circuit, the compensation drive circuit, and the reset drive circuit, the output terminal of each of the drive circuits comprises: a drive output terminal and a shift output terminal, wherein the drive output terminal is coupled to the pixels, and the shift output terminal is coupled to another stage of the drive circuit as cascaded; and the anti-creeping pull-down sub-circuit is further coupled to the pull-up node and a fourth power supply terminal respectively, and is configured to control a potential of the shift output terminal based on the potential of the pull-up node, the potential of the pull-down node, the second power supply signal, and the third power supply signal, and to control a potential of the drive output terminal based on the potential of the pull-down node and a fourth pull-down power supply signal provided by the fourth power supply terminal.

15. The pixel drive circuit according to claim 14, wherein the anti-creeping pull-down sub-circuit comprises: a fourth transistor, a fifth transistor, a sixth transistor, a seventh transistor, and a second capacitor; and wherein gates of the fourth transistor and the fifth transistor are both coupled to the pull-down node, a first electrode of the fourth transistor is coupled to the second power supply terminal, a second electrode of the fourth transistor is coupled to a first electrode of the fifth transistor, and a second electrode of the fifth transistor is coupled to the shift output terminal;

a gate of the sixth transistor is coupled to the pull-up node, a first electrode of the sixth transistor is coupled to the third power supply terminal, and a second electrode of the sixth transistor is coupled to the first electrode of the fifth transistor;

a gate of the seventh transistor is coupled to the pull-down node, a first electrode of the seventh transistor is coupled to the fourth power supply terminal, and a second electrode of the seventh transistor is coupled to the drive output terminal; and one end of the second capacitor is coupled to the pull-down node, and another end of the second capacitor is coupled to the fourth power supply terminal.

16. The pixel drive circuit according to claim 1, wherein for the plurality of cascaded scan drive circuits, an input terminal of an $N^{th}$ scan drive circuit is coupled to an output terminal of an $(N-2)^{th}$ scan drive circuit, a reset terminal of the $N^{th}$ scan drive circuit is coupled to an output terminal of an $(N+4)^{th}$ scan drive circuit, and the scan drive circuits coupled to odd-numbered rows of pixels share same input terminals and the same reset terminals with the scan drive circuits coupled to even-numbered rows of pixels, where N is an integer greater than or equal to 3, and N is smaller than a number of the plurality of scan drive circuits; and for the plurality of cascaded emission drive circuits, the plurality of cascaded compensation drive circuits, and the plurality of cascaded reset drive circuits, an output terminal of a previous drive circuit is coupled to an input terminal of an adjacent next-stage drive circuit, and a reset terminal of a previous drive circuit is coupled to an output terminal of an adjacent next-stage drive circuit.

17. The pixel drive circuit according to claim 15, wherein the transistors comprised in the pixel drive circuit are all made of an oxide material.

18. The pixel drive circuit according to claim 1, further comprising:

two sets of scan drive circuits respectively disposed on both sides of the pixels in the pixel row direction, each set of scan drive circuits comprising the plurality of scan drive circuits as cascaded;

two sets of emission drive circuits respectively disposed on both sides of the pixels in the pixel row direction, each set of emission drive circuits comprising the plurality of emission drive circuits as cascaded;

two sets of compensation drive circuits respectively disposed on both sides of the pixels in the pixel row direction, each set of compensation drive circuits comprising the plurality of compensation drive circuits as cascaded; and two sets of reset drive circuits respectively disposed on both sides of the pixels in the pixel row direction, each set of reset drive circuits comprising the plurality of reset drive circuits as cascaded.

19. A display apparatus, comprising: a plurality of pixels, and a pixel drive circuit;

wherein the pixel drive circuit is coupled to the plurality of pixels and is configured to drive emission of the plurality of pixels; and the pixel drive circuit comprises:

a plurality of scan drive circuits cascaded in a pixel column direction, wherein the plurality of scan drive circuits are coupled to a plurality of rows of pixels via a plurality of gate lines;

and each of the scan drive circuits is further coupled to a scan drive line and is configured to transmit a gate drive signal to a gate line coupled to the scan drive circuit based on a drive signal provided by the scan drive line;

a plurality of emission drive circuits cascaded in the pixel column direction, wherein the plurality of emission drive circuits are coupled to the plurality of rows of pixels via a plurality of emission control lines; and each of the emission drive circuits is further coupled to an emission drive line and is configured to transmit an emission control signal to an emission control line coupled to the emission drive circuit based on a drive signal provided by the emission drive line:

a plurality of compensation drive circuits cascaded in the pixel column direction, wherein the plurality of compensation drive circuits are coupled to the plurality of rows of pixels via a plurality of compensation lines; and each of the compensation drive circuits is further coupled to a compensation drive line and is configured to transmit a compensation signal to a compensation line coupled to the compensation drive circuit based on a drive signal provided by the compensation drive line; and a plurality of reset drive circuits cascaded in the pixel column direction, wherein the plurality of reset drive circuits are coupled to the plurality of rows of pixels via a plurality of reset lines; and each of the reset drive circuits is further coupled to a reset drive line and is configured to transmit a reset signal to a reset line coupled to the reset drive circuit based on a drive signal provided by the reset drive line:

wherein a scan drive circuit, a emission drive circuit, a compensation drive circuit, and a reset drive circuit that are coupled to a same row of pixels are arranged sequentially in a pixel row direction, and the scan drive circuit is disposed on a side distal to the pixels; and among signal lines as coupled in the pixel drive circuit, a plurality of the signal lines is overlapped with each other, and cutouts are provided at overlapping portions of the plurality of signal lines.

20. The display apparatus according to claim 19, wherein each of the pixels comprises: a pixel circuit and an emission element, wherein the pixel circuit comprises: a data writing sub-circuit, a emission control sub-circuit, a compensation sub-circuit, a reset sub-circuit, a potential adjustment sub-circuit, and a drive sub-circuit; and wherein the data writing sub-circuit is respectively coupled to a gate line, a data line, and a control terminal of the drive sub-circuit, and is configured to control connection and disconnection between the data line and the control terminal of the drive sub-circuit based on a gate drive signal provided by the gate line;

the emission control sub-circuit is respectively coupled to an emission control line, a charging power supply line, and an input terminal of the drive sub-circuit, and is configured to control connection and disconnection between the charging power supply line and the input terminal of the drive sub-circuit based on an emission control signal provided by the emission control line;

the compensation sub-circuit is respectively coupled to a compensation line, a reference signal line, and the control terminal of the drive sub-circuit, and is configured to control connection and disconnection between the reference signal line and the control terminal of the drive sub-circuit based on a compensation signal provided by the compensation line;

the reset sub-circuit is respectively coupled to a reset line, an initial power supply line, and the output terminal of the drive sub-circuit, and is configured to control connection and disconnection between the initial power supply line (Vinit) and the output terminal of the drive sub-circuit based on a reset signal provided by the reset line;

the potential adjustment sub-circuit is respectively coupled to the control terminal of the drive sub-circuit and the output terminal of the drive sub-circuit, and is configured to adjust a potential of the control terminal of the drive sub-circuit and a potential of the output terminal of the drive sub-circuit;

the output terminal of the drive sub-circuit is further coupled to a first electrode of the emission element, and is configured to transmit an emission drive signal to the first electrode of the emission element based on a potential of the input terminal of the drive sub-circuit and the potential of the control terminal of the drive sub-circuit; and a second electrode of the emission element is further coupled to a pull-down power supply line and is configured to emit light based on the emission drive signal and a pull-down power supply signal provided by the pull-down power supply line.

* * * * *